United States Patent
Ko et al.

(10) Patent No.: US 12,143,919 B2
(45) Date of Patent: *Nov. 12, 2024

(54) WIRELESS COMMUNICATION METHOD AND WIRELESS COMMUNICATION TERMINAL USING MULTI-BASIC SERVICE IDENTIFIER SET

(71) Applicants: WILUS INSTITUTE OF STANDARDS AND TECHNOLOGY INC., Gyeonggi-do (KR); SK TELECOM CO., LTD., Seoul (KR)

(72) Inventors: Geonjung Ko, Gyeonggi-do (KR); Juhyung Son, Gyeonggi-do (KR); Jinsam Kwak, Gyeonggi-do (KR); Woojin Ahn, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,370

(22) Filed: May 19, 2023

(65) Prior Publication Data

US 2023/0292222 A1    Sep. 14, 2023

Related U.S. Application Data

(63) Continuation of application No. 17/395,384, filed on Aug. 5, 2021, now Pat. No. 11,696,214, which is a
(Continued)

(30) Foreign Application Priority Data

Dec. 9, 2015  (KR) .................. 10-2015-0175411
Dec. 24, 2015 (KR) .................. 10-2015-0186868
(Continued)

(51) Int. Cl.
*H04W 48/08* (2009.01)
*H04L 12/46* (2006.01)
(Continued)

(52) U.S. Cl.
CPC ........... *H04W 48/08* (2013.01); *H04L 12/462* (2013.01); *H04W 48/16* (2013.01);
(Continued)

(58) Field of Classification Search
CPC . H04W 88/085; H04W 74/006; H04W 48/16; H04W 48/08; H04W 74/0808;
(Continued)

(56) References Cited

U.S. PATENT DOCUMENTS 8,483,741 B1    7/2013  Hussain et al.
9,936,537 B2 *  4/2018  Kwon ................... H04W 84/12
(Continued)

FOREIGN PATENT DOCUMENTS

CN    1777169    5/2006
CN    1894914    1/2007
(Continued)

OTHER PUBLICATIONS

Office Action dated Aug. 23, 2023 for Chinese Patent Application No. 202210048394.2 and its English translation provided by Applicant's foreign counsel.
(Continued)

*Primary Examiner* — Brian D Nguyen
(74) *Attorney, Agent, or Firm* — Womble Bond Dickinson (US) LLP

(57) ABSTRACT

Provided is a wireless communication terminal that communicates wirelessly. The terminal includes: a transceiver; and a processor. The processor is configured to receive a frame through the transceiver, determine whether the frame is classified into an Intra-Basic Service Set (BSS) frame or
(Continued)

an Inter-BSS frame according to a BSS from which the frame is transmitted, and access a channel according to whether the frame is an Intra-BSS frame or an Inter-BSS frame.

8 Claims, 17 Drawing Sheets

Related U.S. Application Data continuation of application No. 16/792,166, filed on Feb. 14, 2020, now Pat. No. 11,122,496, which is a continuation of application No. 16/000,883, filed on Jun. 5, 2018, now Pat. No. 10,616,819, which is a continuation of application No. PCT/KR2016/014494, filed on Dec. 9, 2016.

(30) Foreign Application Priority Data

Jan. 13, 2016 (KR) .................. 10-2016-0004464
Sep. 7, 2016 (KR) .................. 10-2016-0114821

(51) Int. Cl.
| | | |
|---|---|---|
| *H04W 48/12* | (2009.01) | |
| *H04W 48/16* | (2009.01) | |
| *H04W 48/20* | (2009.01) | |
| *H04W 74/00* | (2009.01) | |
| *H04W 74/08* | (2024.01) | |
| *H04W 84/12* | (2009.01) | |
| *H04W 88/08* | (2009.01) | |
| *H04W 74/0808* | (2024.01) | |

(52) U.S. Cl.
CPC ........ *H04W 74/006* (2013.01); *H04W 88/085* (2013.01); *H04W 48/12* (2013.01); *H04W 48/20* (2013.01); *H04W 74/0808* (2013.01); *H04W 84/12* (2013.01)

(58) Field of Classification Search
CPC .... H04W 48/12; H04W 48/20; H04L 12/462; H04D 30/70
See application file for complete search history.

(56) References Cited

U.S. PATENT DOCUMENTS

| | | | |
|---|---|---|---|
| 9,974,040 | B1 | 5/2018 | Chu et al. |
| 10,015,821 | B2* | 7/2018 | Oteri .................. H04W 72/27 |
| 10,045,340 | B1* | 8/2018 | Chu .................. H04W 74/0816 |
| 10,136,450 | B2 | 11/2018 | Lee et al. |
| 10,433,345 | B2 | 10/2019 | Kim et al. |
| 11,129,163 | B2 | 9/2021 | Ko et al. |
| 11,700,597 | B2 | 7/2023 | Ko et al. |
| 2004/0166851 | A1 | 8/2004 | Backes et al. |
| 2004/0203688 | A1 | 10/2004 | Backes et al. |
| 2006/0085543 | A1 | 4/2006 | Hrastar et al. |
| 2007/0041334 | A1 | 2/2007 | Song et al. |
| 2007/0081477 | A1 | 4/2007 | Jakkahalli et al. |
| 2011/0255401 | A1 | 10/2011 | Seok |
| 2012/0178407 | A1 | 7/2012 | Rudolf et al. |
| 2012/0327870 | A1 | 12/2012 | Grandhi et al. |
| 2013/0121293 | A1 | 5/2013 | Surineni et al. |
| 2013/0148609 | A1 | 6/2013 | Ram et al. |
| 2013/0301553 | A1 | 11/2013 | Klein |
| 2014/0050210 | A1 | 2/2014 | Waters et al. |
| 2014/0269544 | A1 | 9/2014 | Zhu et al. |
| 2014/0307726 | A1 | 10/2014 | Kang et al. |
| 2014/0362840 | A1 | 12/2014 | Wong et al. |
| 2015/0029977 | A1 | 1/2015 | Seok |
| 2015/0110093 | A1 | 4/2015 | Asterjadhi et al. |
| 2015/0124774 | A1 | 5/2015 | Kaushik et al. |
| 2015/0181620 | A1 | 6/2015 | Seok |
| 2015/0264617 | A1 | 9/2015 | Choudhury et al. |
| 2015/0341750 | A1 | 11/2015 | Hayes et al. |
| 2015/0359008 | A1 | 12/2015 | Wang et al. |
| 2016/0050691 | A1 | 2/2016 | Jauh et al. |
| 2016/0081132 | A1 | 3/2016 | Lee et al. |
| 2016/0088558 | A1 | 3/2016 | Chu et al. |
| 2016/0150569 | A1 | 5/2016 | Benveniste |
| 2016/0157195 | A1 | 6/2016 | Wang et al. |
| 2016/0249397 | A1 | 8/2016 | Seok |
| 2016/0381688 | A1 | 12/2016 | Hedayat |
| 2017/0006661 | A1 | 1/2017 | Huang et al. |
| 2017/0048785 | A1 | 2/2017 | Ge et al. |
| 2017/0094685 | A1 | 3/2017 | Noh et al. |
| 2017/0289987 | A1 | 10/2017 | Seok |
| 2017/0367078 | A1 | 12/2017 | Chun et al. |
| 2018/0213565 | A1 | 7/2018 | Huang et al. |
| 2018/0220488 | A1 | 8/2018 | Huang et al. |
| 2018/0227952 | A1 | 8/2018 | Kim et al. |
| 2018/0242394 | A1 | 8/2018 | Wong et al. |
| 2018/0248646 | A1 | 8/2018 | Wikström et al. |
| 2018/0270038 | A1 | 9/2018 | Oteri et al. |
| 2018/0270863 | A1 | 9/2018 | Oteri et al. |
| 2018/0324859 | A1 | 11/2018 | Kim et al. |
| 2018/0336499 | A1 | 11/2018 | Kneckt et al. |
| 2019/0021106 | A1 | 1/2019 | Pteri et al. |
| 2019/0215054 | A1* | 7/2019 | Zhang .............. H04W 52/0229 |
| 2019/0289625 | A1* | 9/2019 | Kwon .................. H04W 72/23 |
| 2019/0335394 | A1 | 10/2019 | Kim et al. |
| 2020/0187091 | A1 | 6/2020 | Ko et al. |
| 2020/0221088 | A1 | 7/2020 | Tourapis |
| 2020/0221388 | A1 | 7/2020 | Oteri et al. |
| 2020/0267741 | A1 | 8/2020 | Kwon et al. |
| 2021/0368422 | A1 | 11/2021 | Ko et al. |
| 2022/0239578 | A1 | 7/2022 | Raleigh et al. |
| 2022/0345341 | A1 | 10/2022 | Lee et al. |
| 2024/0032091 | A1* | 1/2024 | Anepu .................. H04W 28/26 |

FOREIGN PATENT DOCUMENTS

| | | |
|---|---|---|
| CN | 1917462 | 2/2007 |
| CN | 101336540 | 12/2008 |
| CN | 102761938 | 10/2012 |
| CN | 102771059 | 11/2012 |
| CN | 102844999 | 12/2012 |
| CN | 103052077 | 4/2013 |
| CN | 103096492 | 5/2013 |
| CN | 103167471 | 6/2013 |
| CN | 103178931 | 6/2013 |
| CN | 103228046 | 7/2013 |
| CN | 103348742 | 10/2013 |
| CN | 103516461 | 1/2014 |
| CN | 103731858 | 4/2014 |
| CN | 103918346 | 7/2014 |
| CN | 104066091 | 9/2014 |
| CN | 104272797 | 1/2015 |
| CN | 104335510 | 2/2015 |
| CN | 104380683 | 2/2015 |
| CN | 104488347 | 4/2015 |
| CN | 104956735 | 9/2015 |
| CN | 105075378 | 11/2015 |
| CN | 105379331 | 3/2016 |
| EP | 2 451 200 | 5/2012 |
| EP | 2 011 287 | 3/2017 |
| EP | 2 548 316 | 12/2018 |
| JP | 2004-525586 | 8/2004 |
| JP | 2006-319444 | 11/2006 |
| JP | 2015-167417 | 9/2015 |
| KR | 10-2013-0005289 | 1/2013 |
| KR | 10-2013-0028972 | 3/2013 |
| KR | 10-2015-0073855 | 7/2015 |
| KR | 10-2015-0124389 | 11/2015 |
| WO | 2011/025145 | 3/2011 |
| WO | 2011/115408 | 9/2011 |
| WO | 2012/077859 | 6/2012 |
| WO | 2014/027829 | 2/2014 |
| WO | 2014/027838 | 2/2014 |
| WO | 2014/179713 | 11/2014 |
| WO | 2015/011278 | 1/2015 |

(56) References Cited

FOREIGN PATENT DOCUMENTS

| WO | 2015/042018 | 3/2015 |
|----|-------------|--------|
| WO | 2015/050311 | 4/2015 |
| WO | 2015/064943 | 5/2015 |
| WO | 2015/112780 | 7/2015 |
| WO | 2015/119379 | 8/2015 |
| WO | 2015/120488 | 8/2015 |
| WO | 2015/147874 | 10/2015 |
| WO | 2015/156616 | 10/2015 |
| WO | 2015/183199 | 12/2015 |
| WO | 2016/021792 | 2/2016 |
| WO | 2017/099542 | 6/2017 |

OTHER PUBLICATIONS

Notice of Allowance dated Aug. 25, 2023 for Chinese Patent Application No. 202210048421.6 and its English translation provided by Applicant's foreign counsel.
Notice of Allowance dated Sep. 22, 2023 for Korean Patent Application No. 10-2022-7032149 and its English translation provided by Applicant's foreign counsel.
Notice of Allowance dated Oct. 19, 2023 for Korean Patent Application No. 10-2022-7034781 and its English translation provided by Applicant's foreign counsel.
International Search Report for PCT/KR2016/014494 mailed on Mar. 28, 2017 and its English translation from WIPO (published as WO 2017/099542).
Written Opinion of the International Searching Authority for PCT/KR2016/014494 mailed on Mar. 28, 2017 and its English translation by WIPO (published as WO 2017/099542).
International Preliminary Report on Patentability Chapter I issued on Jun. 12, 2018 and its English translation from WIPO (published as WO 2017/099542).
Non-Final Office Action dated Jun. 27, 2019 for U.S. Appl. No. 16/000,883 (published as 2018/0295567).
Notice of Allowance mailed on Dec. 4, 2019 for U.S. Appl. No. 16/000,883 (published as 2018/0295567).
Office Action dated Mar. 5, 2020 for U.S. Appl. No. 16/121,546 (now published as US 2019/0021091).
Notice of Allowance dated Jul. 1, 2020 for Korean Patent Application No. 10-2018-7016103 and its English translation provided by Applicant's foreign counsel.
Office Action dated Sep. 3, 2020 for U.S. Appl. No. 16/121,546.
Office Action dated Jan. 25, 2021 for U.S. Appl. No. 16/792,163.
Office Action dated Jan. 25, 2021 for Chinese Patent Application No. 201680071981.6 and its English translation provided by Applicant's foreign counsel.
Office Action dated Mar. 17, 2021 for Korean Patent Application No. 10-2018-7025837 and its English translation provided by Applicant's foreign counsel.
Geonjung Ko, Wilus, "BSS Color Settings for a Multiple BSSID Set", IEEE 802.11-16/0042r0, Jan. 18, 2016. Slides 1-11.
Notice of Allowance dated Mar. 17, 2021 for Korean Patent Application No. 10-2020-7028167 and its English translation provided by Applicant's foreign counsel.
Notice of Allowance dated Mar. 17, 2021 for Korean Patent Application No. 10-2020-7028169 and its English translation provided by Applicant's foreign counsel.
Office Action dated Mar. 23, 2021 for Indian Patent Application No. 201827021492.
Office Action dated Apr. 5, 2021 for Indian Patent Application No. 201827033017.
Notice of Allowance dated Apr. 28, 2021 for U.S. Appl. No. 16/792,163.
Notice of Allowance dated Apr. 29, 2020 for U.S. Appl. No. 15/953,404.
Office Action dated May 6, 2020 for European Patent Application No. 16 857 801.1.
Matthew Fischer et al: "CID 205 BSSID Color Bits". Sep. 18, 2013, XP055421527, IEEE-SA mentor, Piscataway, NJ USA, Retrieved from the Internet: URL:https://mentor.ieee.org/802.11/den/13/11-13-1207-01-00ah-partial-aid-color-bits.pptx [retrieved on Nov. 3, 2017].
John Son (Wilus Institute): "Further Considerations on Enhanced CCA for 11ax; 11-14-0847-01-00ax-further-considerations-on-enhanced-cca-for-11ax", IEEE Draft; 11-14-0847-01-00AX-Further-Considerations-on-Enhanced-CCA-for-11AX, IEEE-SA Mentor. Piscataway, NJ USA, vol. 802.11 ax, No. 1, Jul. 15, 2014, pp. 1-12, XP068069563 [retrieved on Jul. 15, 2014].
Robert Stacey (Intel): "Spec Framework; 11-15-0132-09-00ax-spec-framework", IEEE Draft; 11-15-0132-09-00AX-Spec-Framework, IEEE-SA Mentor, Piscataway, NJ USA, vol. 802.11ax, No. 9, Sep. 22, 2015, pp. 1-22, XP068097995, [retrieved on Sep. 22, 2015].
Alfred Asterjadhi: Identifiers in HE PPDUs for power saving, IEEE Draft; 11-15-1122-00-00AX-Identifiers-in-HE-PPDUS-for-Power-Saving, IEEE-SA Mentor, Piscataway, NJ USA, vol. 802.11ax Sep. 12, 2015, pp. 1-18, XP068098373, Retrieved from the Internet: URL:https://mentor.ieee.org/802.11/den/15/11-15-1122-00-00ax-identifiers-in-he-ppdus-for-power-saving.pptx.
Office Action dated May 27, 2020 for Indian Patent Application No. 201827014271.
Notice of Allowance dated Jul. 24, 2020 for Korean Patent Application No. 10-2018-7010293 and its English translation provided by Applicant's foreign counsel.
Office Action dated Jul. 28, 2020 for Japanese Patent Application No. 2019-142262 and its English translation provided by Applicant's foreign counsel.
Notice of Allowance dated Jul. 20, 2021 for U.S. Appl. No. 16/792,166 (published as US 2020/0187091).
Notice of Allowance dated Apr. 29, 2021 for U.S. Appl. No. 16/792,166 (published as US 2020/0187091).
Office Action dated Jan. 25, 2021 for U.S. Appl. No. 16/792,166 (published as US 2020/0187091).
Office Action dated Dec. 15, 2022 for Korean Patent Application No. 10-2022-7034781 and its English translation provided by the Applicant's foreign counsel.
Notice of Allowance dated Jan. 11, 2023 for U.S. Appl. No. 17/227,289.
Hearing Notice dated Feb. 20, 2023 for Indian Patent Application No. 201827021492.
Office Action dated Sep. 15, 2022 for U.S. Appl. No. 17/227,289.
Hearing Notice dated Nov. 6, 2022 for Indian Patent Application No. 201827033017.
Office Action dated Nov. 15, 2022 for Korean Patent Application No. 10-2022-7032149 and its English translation provided by the Applicant's foreign counsel.
Genjung KO, Wilus, "BSS Color Settings for a Multiple BSSID Set", IEEE 802.11-16/0042r1, Jan. 18, 2016, Slides 1-11.
Office Action dated Dec. 27, 2021 for Korean Patent Application No. 10-2021-7018658 and its English translation provided by the Applicant's foreign counsel.
Office Action dated Dec. 30, 2021 for Korean Patent Application No. 10-2021-7041433 and its English translation provided by the Applicant's foreign counsel.
Office Action dated Jan. 4, 2022 for Korean Patent Application No. 10-2021-7041428 and its English translation provided by the Applicant's foreign counsel.
First Office Action dated Oct. 15, 2021 for Chinese Patent Application No. 201780015247.2 and its English translation provided by the Applicant's foreign counsel.
Notice of Allowance dated Nov. 3, 2021 for Chinese Patent Application No. 201680071981.6 and its English translation provided by the Applicant's foreign counsel.
Global System for Mobile Communications: "3GPP TR 45.820 v2.0.0_revmarked", 3rd Generation Partnership Project; Technical Specification Group GSM/EDGE Radio Access Network; Cellular System Support for Ultra Low Complexity and Low Throughput Internet of Things; (Release 13), Aug. 20, 2015, pp. 1-514.
Han Lihong: "Research on DRX Algorithm based on LTE/LTE-Advanced System", Thesis defense date May 2014, Wuhan University of Technology, China, Apr. 1, 2014, pp. 1-74.
Global System for Mobile Communications: "3GPP TR 45.820 v2.0.0_clean", $3^{rd}$ Generation Partnership Project; Technical Speci-

(56) References Cited

OTHER PUBLICATIONS fication Group GSM/EDGE Radio Access Network; Cellular System Support for Ultra Low Complexity and Low Throughput Internet of Things; (Release 13), Aug. 20, 2015, pp. 1-509.
Mahmoud Elsaadany et al.: "Cellular LTE-A Technologies for the Future Internet-of-Things: Physical Layer Features and Challenges", Dec. 7, 2015, pp. 1-28.
Office Action dated Mar. 16, 2022 for Chinese Patent Application No. 201780015247.2 and its English translation provided by the Applicant's foreign counsel.
Notice of Allowance dated Apr. 21, 2022 for Korean Patent Application No. 10-2021-7041433 and its English translation provided by the Applicant's foreign counsel.
Notice of Allowance dated Mar. 3, 2023 for U.S. Appl. No. 17/395,384 (published as US 2021/0368422).
Office Action dated Nov. 14, 2022 for U.S. Appl. No. 17/395,384 (published as US 2021/0368422).
Office Action dated Dec. 21, 2023 for U.S. Appl. No. 18/133,520.
Office Action dated Feb. 1, 2024 for Korean Patent Application No. 10-2023-7044223 and its English translation provided by Applicant's foreign counsel.
Office Action dated Mar. 4, 2024 for Korean Patent Application No. 10-2024-7002126 and its English translation provided by Applicant's foreign counsel.
Notice of Allowance dated Mar. 6, 2024 for Chinese Patent Application No. 202210048394.2 and its English translation provided by Applicant's foreign counsel.
John (Ju-Hyung) Son et al.: "Legacy Fairness Issues of Enhanced CCA", doc.: IEEE 802.11-15/0085r1, Jan. 12, 2015, slides 1-13.
Abhishek Patil et al.: "Proposed Resolution for CID 193 (BSS Color Disable Indication)", doc.: IEEE 802.11-16/1413r0, Nov. 2016, pp. 1-3.
Geonjung KO et al.: "Discussion on Partial BSS Color", doc.: IEEE 802.11-16/0918rl, Sep. 12, 2016, slides 1-14.
Geonjung KO et al.: "BSS Color Collision", doc.: IEEE 802.11-16/0640r0, May 16, 2016, slides 1-13.
Geonjung KO et al.: "Issues on BSS Color Bits Collision", doc.: IEEE 802.11-16/0396r0, Mar. 14, 2016, slides 1-18.
Office Action dated Sep. 7, 2024 for Chinese Patent Application No. 202210906426.8 and its English translation provided by Applicant's foreign counsel.
U.S. Appl. No. 62/327,445, filed Apr. 26, 2016.
U.S. Appl. No. 62/412,226, filed Oct. 24, 2016.
U.S. Appl. No. 62/434,423, filed Dec. 15, 2016.
U.S. Appl. No. 62/433,795, filed Dec. 14, 2016.
Office Action dated Dec. 31, 2018 for U.S. Appl. No. 15/774,259 (now issued as U.S. Pat. No. 10,433,345).
Amendment dated Apr. 1, 2019 for U.S. Appl. No. 15/774,259 (now issued as U.S. Pat. No. 10,433,345).
Notice of Allowance dated May 16, 2019 for U.S. Appl. No. 15/774,259 (now issued as U.S. Pat. No. 10,433,345).
Alcatel-Lucent, Alcatel-Lucent Shanghai Bell, Nokia Networks: "Encoding of BSS Container in E-UTRAN to GERAN PS handover", 3GPP TSG CT Meeting #65, CP-140736, Edinburgh, GB; Sep. 15, 2014, pp. 1-10.

* cited by examiner

Multiple BSSID element format

(a)

| Element ID | Length | MaxBSSID Indicator | Optional Subelements |
|---|---|---|---|

Octets:      1      1      1      variable

Optional subelement IDs for Multiple BSSID

(b)

| Subelement ID | Name | Extensible |
|---|---|---|
| 0 | Nontransmitted BSSID Profile | |
| 1–220 | Reserved | |
| 221 | Vendor Specific | |
| 222–255 | Reserved | |

*FIG. 7*

WIRELESS COMMUNICATION METHOD AND WIRELESS COMMUNICATION TERMINAL USING MULTI-BASIC SERVICE IDENTIFIER SET

CROSS-REFERENCE TO RELATED APPLICATIONS

This application is a continuation of U.S. patent application Ser. No. 17/395,384 filed on Aug. 5, 2021, now issued as U.S. Pat. No. 11,696,214, which is a continuation of U.S. patent application Ser. No. 16/792,166 filed on Feb. 14, 2020, now issued as U.S. Pat. No. 11,122,496 dated Sep. 14, 2021, which is a continuation of U.S. patent application Ser. No. 16/000,883 filed on Jun. 5, 2018, issued as U.S. Pat. No. 10,616,819 dated Apr. 7, 2020, which is a continuation of International Patent Application No. PCT/KR2016/014494 filed on Dec. 9, 2016, which claims the priority to Korean Patent Application No. 10-2015-0175411 filed in the Korean Intellectual Property Office on Dec. 9, 2015, Korean Patent Application No. 10-2015-0186868 filed in the Korean Intellectual Property Office on Dec. 24, 2015, Korean Patent Application No. 10-2016-0004464 filed in the Korean Intellectual Property Office on Jan. 13, 2016, and Korean Patent Application No. 10-2016-0114821 filed in the Korean Intellectual Property Office on Sep. 7, 2016, the entire contents of which are incorporated herein by reference.

TECHNICAL FIELD

The present invention relates to a wireless communication method and a wireless communication terminal using a multi-basic service identifier set.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel Therefore, required is a technology capable of efficiently using bandwidths by simultaneously transmitting data between a plurality of terminals and base terminals.

DISCLOSURE

Technical Problem

An object of an embodiment of the present invention is to provide a wireless communication method and a wireless communication terminal using a multi-basic service identifier set.

Technical Solution

According to an embodiment of the present invention, a wireless communication terminal that communicates wirelessly, the terminal comprises a transceiver; and a processor, wherein the processor is configured to receive a frame through the transceiver, determine whether the frame is an Intra-Basic Service Set (BSS) frame or an Inter-BSS frame according to a BSS from which the frame is transmitted, and access a channel according to whether the frame is an Intra-BSS frame or an Inter-BSS frame.

A BSS of the wireless communication terminal may correspond to a multiple BSS identifier (BSSID) set. The multiple BSSID set may be a set of a BSSID of each of a plurality of BSSs classified into one group. The processor may determine whether the frame is an Intra-BSS frame or an Inter-BSS frame based on a Medium Access Control (MAC) address signaled in a MAC header of the frame and a plurality of BSSIDs included in the multiple BSSID set.

When the MAC address signaled in the MAC header of the frame matches any one of the plurality of BSSIDs included in the multiple BSSID set, the processor may determine the frame as an Intra-BSS frame.

When a Transmitter Address or a Receiver Address signaled in the MAC header of the frame matches any one of the plurality of BSSIDs included in the multiple BSSID set, the processor may determine that the frame is an Intra-BSS frame.

When the frame is an Intra-BSS frame and a receiver address (RA) of the frame does not indicate the wireless communication terminal, the processor may enter a power save state.

When the MAC address signaled in the MAC header of the frame matches any one of a plurality of BSSIDs included in the multiple BSSID set and the RA of the frame does not indicate the wireless communication terminal, the processor may enter the power save state.

When a Receiver Address or a Transmitter Address of the frame is one of the plurality of BSSIDs included in the multiple BSSID set and the Receiver Address of the frame is not the MAC address of the wireless communication terminal, the processor may the power save state.

The processor may maintain the power save state during a duration of a PLCP Protocol Data Unit (PPDU) including the frame.

The processor may separately set a Network Allocation Vector (NAV) for an Intra-BSS frame and a NAV for an Inter-BSS frame.

When the MAC address signaled in the MAC header of the frame matches any one of the plurality of BSSIDs included in the multiple BSSID set, the processor may set the NAV for the Intra-BSS frame based on the frame.

A plurality of BSSs corresponding to the multiple BSSID set may have the same BSS color value, and the BSS color may be information identifying a BSS signaled in a physical layer signaling field of a PLCP Protocol Data Unit (PPDU) including the frame.

The processor may apply a first Clear Channel Assessment (CCA) threshold to accessing the channel when the frame is the Intra-BSS frame, and apply a second CCA threshold to accessing the channel when the frame is the Inter-BSS frame. The second CCA threshold may be determined in a Overlapped BSS (OBSS) CCA level range. The OBSS CCA level range may include values equal to or greater than the first CCA threshold.

According to an embodiment of the present invention, an operation method of a wireless communication terminal that communicates wirelessly includes receiving a frame; determining whether the frame is an Intra-BSS frame or an Inter-BSS frame according to a BSS from which the frame is transmitted; and accessing a channel according to whether the frame is an Intra-Basic Service Set (BSS) frame or an Inter-BSS frame.

A BSS of the wireless communication terminal may correspond to a multiple BSS identifier (BSSID) set. The multiple BSSID set may be a set of a BSSID of each of a plurality of BSSs classified into one group. The determining whether the frame is an Intra-BSS frame or an Inter-BSS frame may include determining whether the frame is an Intra-BSS frame or an Inter-BSS frame based on a medium access control (MAC) address signaled in a MAC header of the frame and a plurality of BSSIDs included in the multiple BSSID set.

The determining whether the frame is the Intra-BSS frame or the Inter-BSS frame may include, when the MAC address signaled in the MAC header of the frame matches one of the plurality of BSSIDs included in the multiple BSSID set, determining the frame as an Intra-BSS frame.

The determining the frame as the Intra-BSS frame may include, when a Transmitter Address or a Receiver Address signaled in the MAC header of the frame matches any one of the plurality of BSSIDs included in the multiple BSSID set, determining that the frame is an Intra-BSS frame.

The method may further include, when the frame is an Intra-BSS frame and a receiver address (RA) of the frame does not indicate the wireless communication terminal, entering a power save state.

The entering the power save state may include, when the MAC address signaled in the MAC header of the frame matches any one of a plurality of BSSIDs included in the multiple BSSID set and the RA of the frame does not indicate the wireless communication terminal, entering the power save state.

The plurality of BSSs corresponding to the multiple BSSID set may have the same BSS color value. The BSS color may be information identifying a BSS signaled in a physical layer signaling field of a PLCP Protocol Data Unit (PPDU) including the frame.

The accessing the channel may include applying a first Clear Channel Assessment (CCA) threshold to accessing the channel when the frame is the Intra-BSS frame, and applying a second CCA threshold to accessing the channel when the frame is the Inter-BSS frame. The second CCA threshold may be determined within a OBSS CCA level range. The OBSS CCA level range may be equal to or greater than the first CCA threshold.

Advantageous Effects

An embodiment of the present invention provides a wireless communication method and a wireless communication terminal using a multi-basic service identifier set.

DESCRIPTION OF DRAWINGS

FIG. 7 shows a signaling format of information on a multi-basic service identifier set according to an embodiment of the present invention.

MODE FOR CARRYING OUT THE INVENTION

Figure 1:
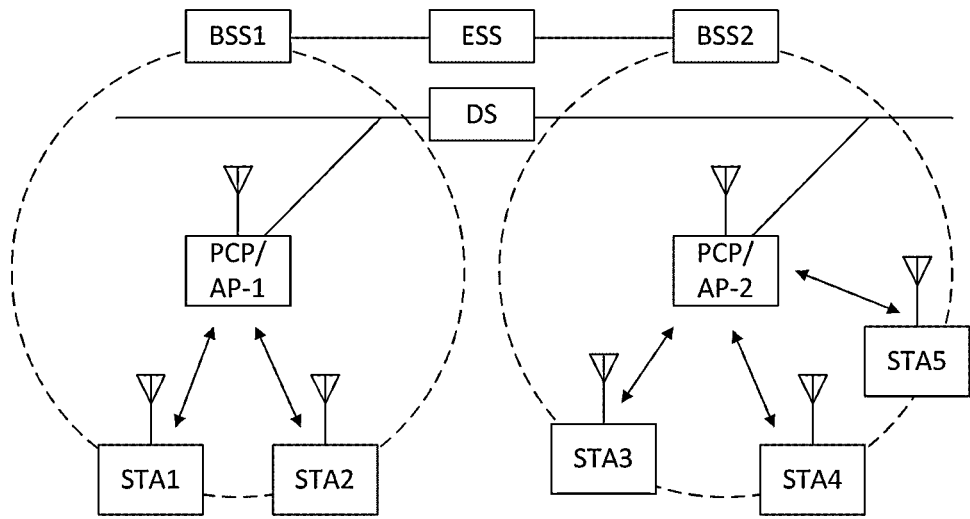
FIG. 1 shows a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2015-0175411 (2015.12.09), Nos. 10-2015-0186868 (2015.12.24), Nos. 10-2016-0004464 (2016.01.13), and Nos. 10-2016-0114821 (2016.09.07) filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
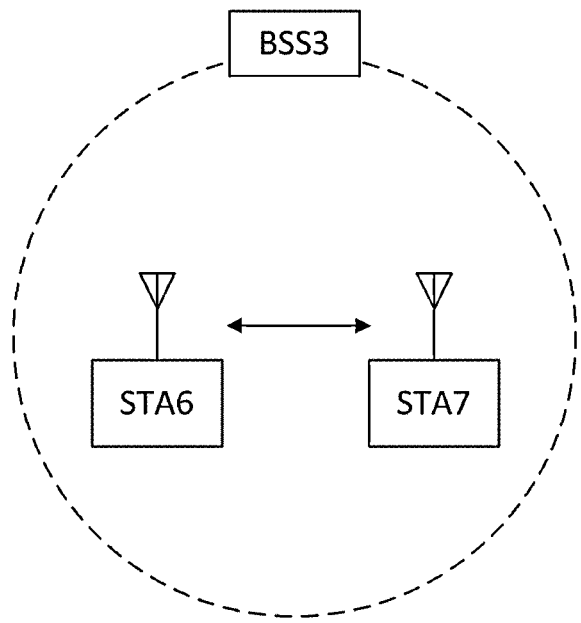
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
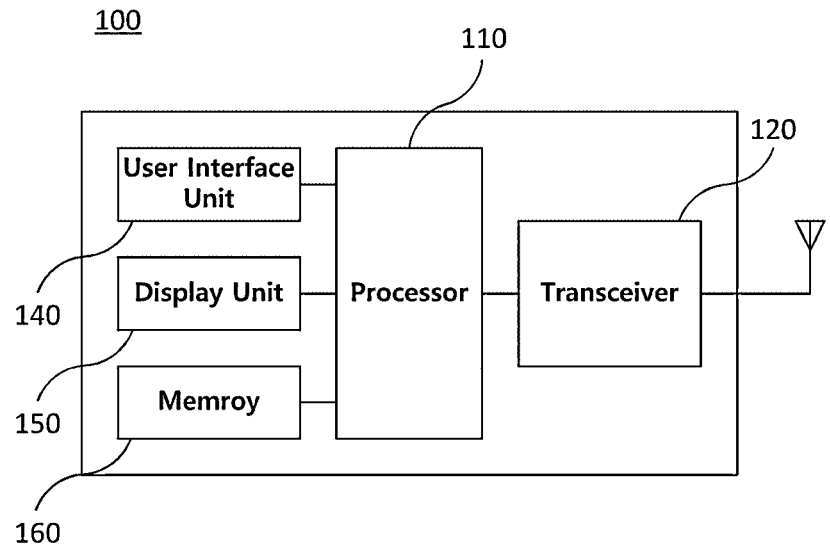
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
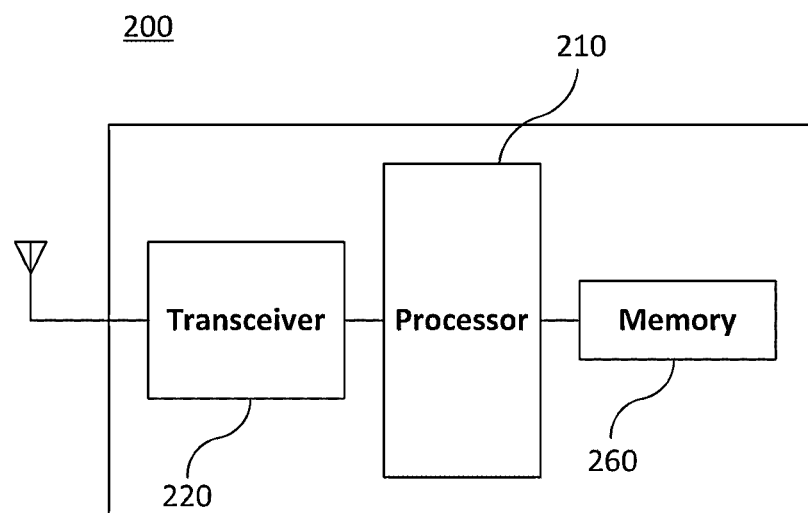
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/ reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
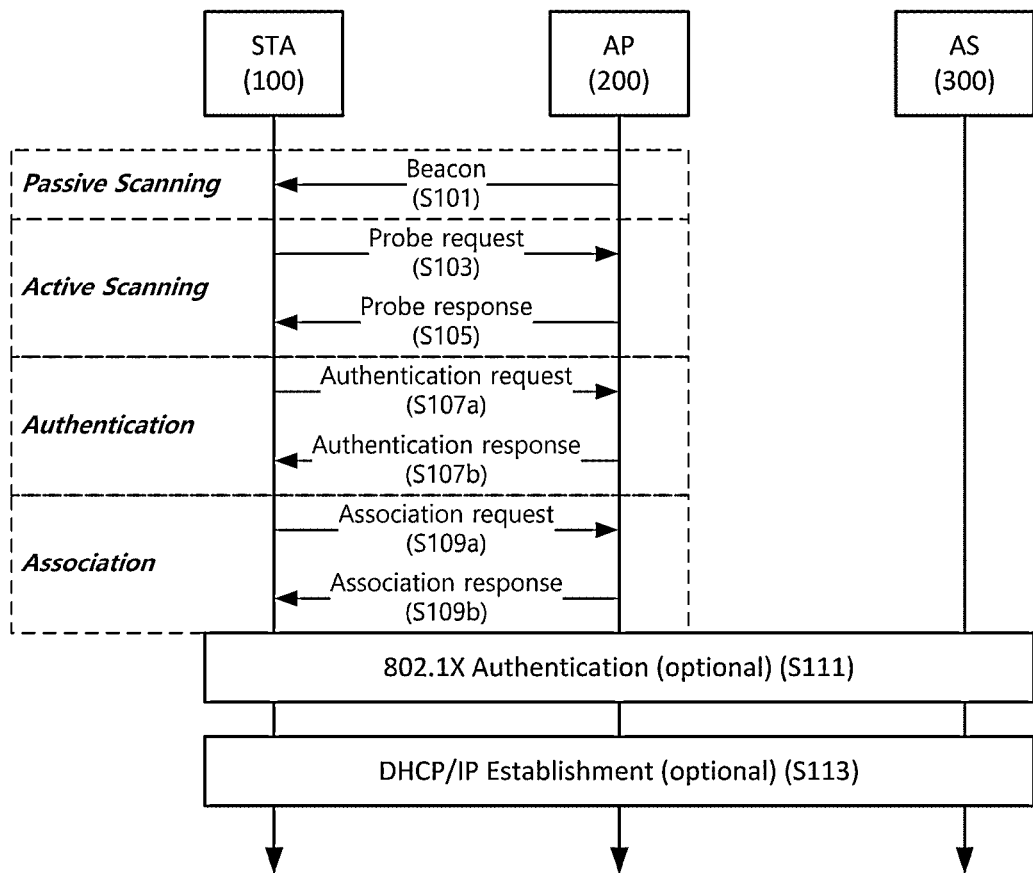
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP.

Figure 6:
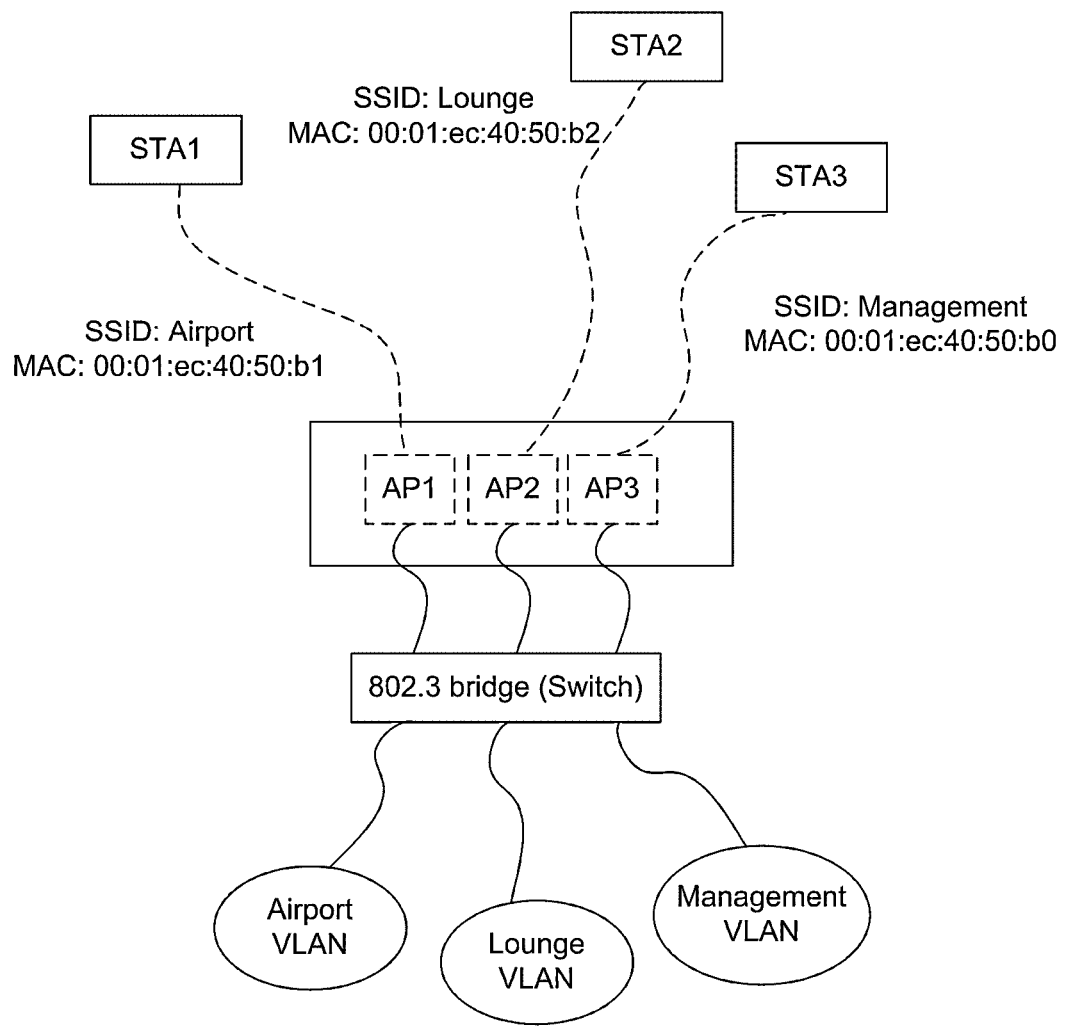
FIG. 6 shows a network for a virtual LAN according to an embodiment of the present invention.

FIG. 6 shows a network for a virtual LAN according to an embodiment of the present invention.

A plurality of virtual LANs (VLANs) may constitute one network. In the embodiment of FIG. 6, one Ethernet switch (802.3 bridge) connects an Airport VLAN, a Lounge VLAN, and a Management VLAN. In a network composed of a plurality of VLANs, the Ethernet switch (802.3 bridge) may control QoS by virtual LAN. Specifically, the Ethernet switch (802.3 bridge) may control the traffic speed according to the virtual LAN. Specifically, the Ethernet switch (802.3 bridge) may control the traffic speed according to the virtual LAN. Specifically, the Ethernet switch (802.3 bridge) may assign different access rights to each virtual LAN.

At this time, the network may include a plurality of physical access points. However, when there are a plurality of physical access points in one network, Due to the management frames transmitted by the plurality of access points, the time for the frame for data transmission to occupy the channel may be very short. Therefore, in a network, as shown in FIG. 6, one wireless communication terminal may operate a plurality of BSSs. A method in which one wireless communication terminal operates a plurality of BSSs will be described in detail with reference to FIG. 7. Also, a frame in this specification refers to a MAC frame unless otherwise specified.

FIG. 7 shows a signaling format of information on a multi-basic service identifier set according to an embodiment of the present invention.

A wireless communication terminal may signal information on a plurality of BSSs through one management frame. Specifically, the wireless communication terminal may signal information on a multiple BSSID set including a plurality of BSS identifiers (BSSIDs) through a management frame. A multiple BSSID set is a BSSID set of a plurality of BSSs classified into one group. When the wireless communication terminal uses a multiple BSSID set, since the wireless communication terminal signals a plurality of BSSs through one management frame, it may increase the amount of time that a data frame may occupy a channel. In a specific embodiment, the wireless communication terminal may set the reference BSSID representing the multiple BSSID set to the BSS information indicated by the management frame, and insert information on a multiple BSSID set into the management frame. The information on the multiple BSSID set may include information related to the maximum number of the plurality of BSSIDs included in the multiple BSSID set. Specifically, the information on the multiple BSSID set may be the multiple BSSID elements in FIG. 7(*a*). At this time, the information on the multiple BSSID set may include sub-elements. Further, the ID value for identifying the sub-element may be the same as that of the embodiment of FIG. 7(*b*).

Multiple BSSID element may include a Element ID field. The Element ID field is an identifier indicating a multiple BSSID element. In addition, the multiple BSSID element may include a Length field. The Length field is a field indicating the length of multiple BSSID elements. In addition, the multiple BSSID element may indicate a MaxBSSID indicator field. At this time, the MaxBSSID indicator field indicates information related to the maximum number of BSSIDs that a multiple BSSID set may include. Specifically, when the value indicated by the MaxBSSID indicator field is n, the maximum number of BSSIDs that a multiple BSSID set may include is $2^n$. The maximum number of BSSIDs is the number including the reference BSSID. In addition, the multiple BSSID element may include an Optional Subelements field. Optional Subelements may include information on the BSS indicated by the Nontransmitted BSSID. The Nontransmitted BSSID indicates the BSSID included in the multiple BSSID set in addition to the reference BSSID. Specifically, the Optional Subelements field may include a Nontransmitted BSSID profile, which is information on the BSS indicated by the Nontransmitted BSSID. The Optional Subelements field may include only information on the BSS indicated by a part of Nontransmitted BSSIDs. At this time, the wireless communication terminal receiving the management frame may obtain information on the BSS indicated by the remaining Nontransmitted BSSID based on the beacon frame or the probe response frame. In addition, the wireless communication terminal receiving the management frame may obtain information on the BSS indicated by the remaining Nontransmitted BSSID by transmitting a probe request frame.

The information on the BSS indicated by the Nontransmitted BSSID may be an element included in the Nontransmitted BSSID Capability element and the beacon frame body. Specifically, the element that may be included in the beacon frame body may be at least one of an SSID, a multiple BSSID-index sub-element, and an FMD Descriptor element. In addition, the same information as the BSS information indicated by the reference BSSID among the information on the BSS indicating the Nontransmitted BSSID may be omitted. Specifically, at least one of a Timestamp and Beacon Interval field indicated by a Nontransmitted BSSID, a DSSS Parameter Set, an IBSS Parameter Set, Country, Channel Switch Announcement, Extended Channel Switch Announcement, Wide Bandwidth Channel Switch, Transmit Power Envelope, Supported Operating Classes, IBSS DFS, ERP Information, HT Capabilities, HT Operation, VHT Capabilities, and a VHT Operation element may be the same as the BSS indicated by the reference BSSID.

In addition, the Optional Sub-element field may include a vendor specific element.

A wireless communication terminal receiving a management frame including information on a multiple BSSID set may obtain information on a multiple BSSID set from a management frame. At this time, the wireless communication terminal may obtain the BSSID included in the multiple BSSID set based on the information on the multiple BSSID set and the reference BSSID. Specifically, the wireless communication terminal may obtain the BSSID included in the multiple BSSID set through the following equation.

$$BSSID(i)=BSSID\_A|BSSID\_B$$

At this time, BSSID_A is a BSSID in which (48-n) Most Significant Bit (MSB) values are equal to (48-n) MSB values of the reference BSSID and n Least Significant Bit (LSB) values are 0. Also, BSSID_B is a BSSID in which (48-n) MSB values are 0, and the n LSB values are the remaining value (mod) when dividing the sum of n LSBs and i of the reference BSSID by $2^n$.

Due to the spread of mobile devices and the supply of wireless communication, wireless communication terminals are increasingly communicating in a dense environment. Particularly, the number of cases where a wireless communication terminal communicates in an environment in which a plurality of BSSs are overlapped is increasing. When multiple BSSs are overlapped, the communication efficiency of the wireless communication terminal may be degraded due to interference with other wireless communication terminals. In particular, when a frequency band is used through a contention procedure, a wireless communication terminal may not secure even a transmission opportunity due to interference with other wireless communication terminals. To solve this problem, a wireless communication terminal may perform a spatial reuse (SR) operation. Specifically, the SR operation may include an operation of accessing the channel depending on whether the received frame is a frame transmitted from a BSS including a wireless communication terminal or a frame transmitted from another BSS. In a specific embodiment, the operation of accessing the channel may include at least one of a CCA operation, a deferral operation, and a Network Allocation Vector (NAV) setting operation. At this time, the NAV represents the time when the radio resource is occupied by the transmission of another wireless communication terminal. The NAV may be maintained regardless of the Clear Channel Assessment (CCA) results. Specifically, the wireless communication terminal may adjust a Clear Channel Assessment (CCA) threshold value according to whether a frame received by the wireless communication terminal is a frame transmitted from a BSS including a wireless communication terminal or a frame transmitted from an OBSS. At this time, in the case of the frame transmitted from the OBSS, the wireless communication terminal may apply a CCA threshold value that is larger than a CCA threshold value applied when the frame is transmitted from the BSS including the wireless communication terminal. At this time, the CCA threshold value indicates a reference value for determining that the channel is busy or idle. In addition, the wireless communication terminal may adjust the transmission power of the PLC Protocol Data Unit (PPPU) transmitted during the SR operation. When multiple BSSID sets are used, the SR operation of the wireless communication terminal is a problem. When multiple BSSID sets are used, the SR operation of the wireless communication terminal will be described with reference to FIG. 8 to FIG. 16.

Figure 8:
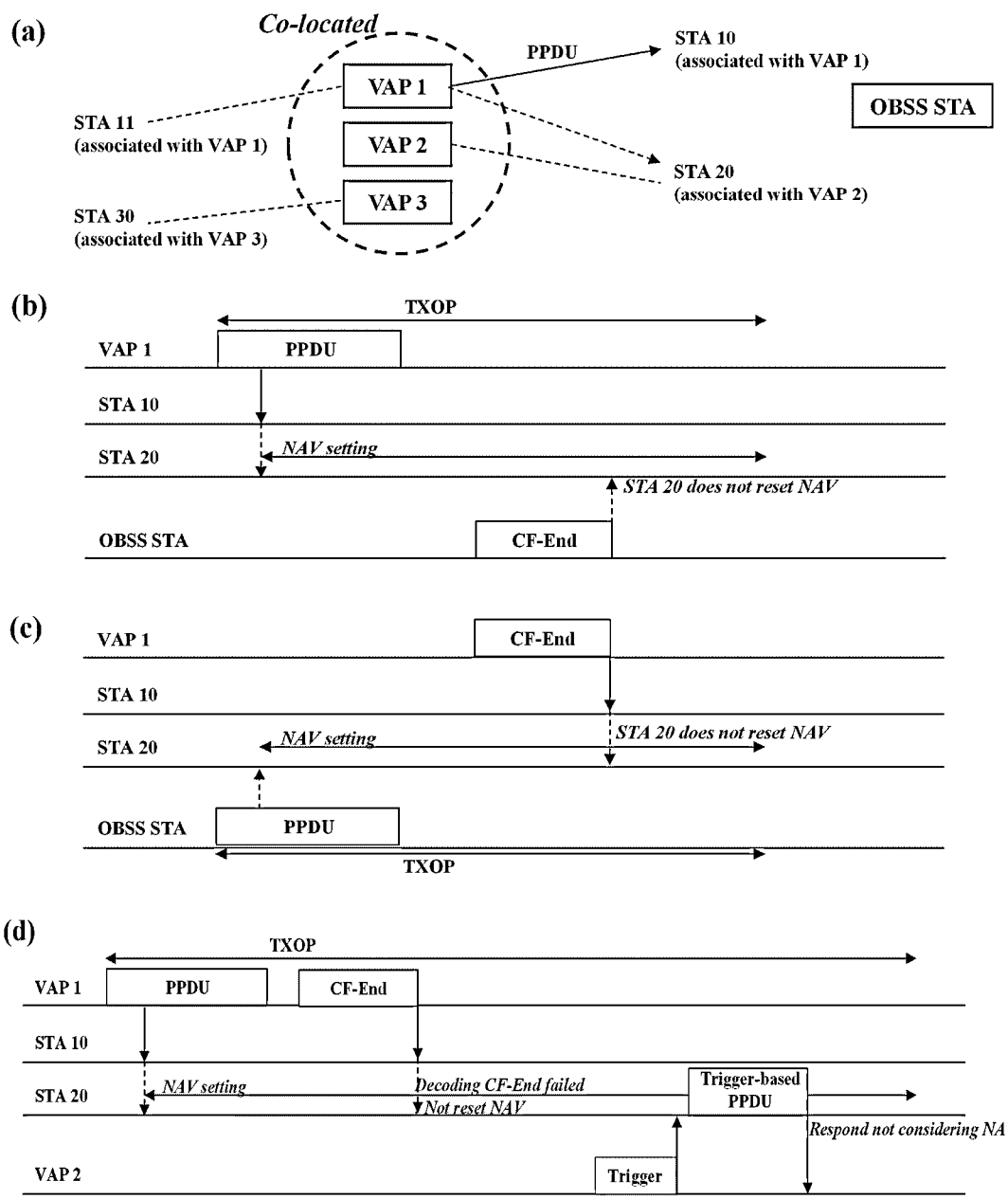
FIG. 8 shows a spatial reuse operation of a wireless communication terminal when a wireless communication terminal according to an embodiment of the present invention uses a multiple BSSID set.

FIG. 8 shows a spatial reuse operation of a wireless communication terminal when a wireless communication terminal according to an embodiment of the present invention uses a multiple BSSID set.

For convenience of explanation, a BSS including a wireless communication terminal is referred to as Intra-BSS, and a basic service set overlapped with Intra-BSS is referred to as an Overlapped Basic Service Set (OBSS). In addition, the PPDU transmitted from the Intra-BSS is referred to as an Intra-BSS PPDU, and the frame transmitted from the OBSS is referred to as an OBSS PPDU or an Inter-BSS PPDU. In addition, a frame transmitted in the Intra-BSS is referred to as an Intra-BSS frame, and a frame transmitted in the OBSS is referred to as an OBSS frame or an Inter-BSS frame. In addition, when the Intra-BSS frame is transmitted, the magnitude of the CCA threshold value applied by the wireless communication terminal is referred to as a general CCA level. When the Inter-BSS frame is transmitted, the magnitude of the CCA threshold value applied by the wireless communication terminal is referred to as the OBSS CCA level. In particular, when an Inter-BSS frame is transmitted, the magnitude of the CCA threshold value used for preamble detection (PD) by a wireless communication terminal is referred to as an OBSS PD level. At this time, the OBSS CCA level may be a value which is equal to or greater than the general CCA level value.

As described above, the wireless communication terminal may access the channel based on whether the received PPDU is Intra-BSS PPDU or Inter-BSS PPDU. Specifically, the wireless communication terminal may access the channel based on whether the received frame is an Intra-BSS frame or an Inter-BSS frame. When a multiple BSSID set is used, the wireless communication terminal may regard a plurality of BSSs identified by each of the plurality of BSSIDs included in the same multiple BSSID set as the same BSS. When a multiple BSSID set is used, the wireless communication terminal may regard a plurality of BSSs identified by each of the plurality of BSSIDs included in the same multiple BSSID set as the same BSS. For convenience of explanation, the BSSID of the BSS including the wireless communication terminal is referred to as a first BSSID, and a BSSID other than the first BSSID is referred to as a second BSSID. When the first BSSID is included in the multiple BSSID set including the second BSSID, the wireless communication terminal may determine the frame transmitted from the BSS identified by the second BSSID as an Intra-BSS frame. In addition, when the first BSSID is not included in any multiple BSSID set or the second BSSID is not included in the multiple BSSID set including the first BSSID, the wireless communication terminal may determine the frame transmitted from the BSS identified by the second BSSID as an inter-BSS frame. Specifically, when the first BSSID is included in the multiple BSSID set including the second BSSID, and the wireless communication terminal detects a frame transmitted from the BSS identified by the second BSSID, the wireless communication terminal may apply the CCA threshold value as a general CCA level instead of the OBSS CCA level. When the first BSSID is not included in any multiple BSSID set or the second BSSID is not included in the multiple BSSID set including the first BSSID and the wireless communication terminal detects a frame transmitted from the BSS identified by the second BSSID, the wireless communication terminal may apply the OBSS CCA level as the CCA threshold value.

In the embodiment of FIG. 8(a), the tenth station STA10 is associated with the first virtual access point VAP1, and the twentieth station STA20 is associated with the second virtual access point VAP2. In addition, the BSSs operated by each of the first virtual access point VAP1 to the third virtual access point VAP3 all have a BSSID included in the same multiple BSSID set. At this time, the twentieth station STA20 determines the PPDU transmitted from the first virtual access point VAP1 as the intra-BSS PPDU. The network relationship of the embodiment of FIG. 8(a) is applied as it is to FIGS. 8(b), 8(c) and 8(d).

In addition, the wireless communication terminal may change the NAV setting depending on whether the received frame is an Intra-BSS frame or an Inter-BSS frame. Specifically, the wireless communication terminal may separately maintain the NAV for the intra-BSS frame and the NAV for the inter-BSS frame. At this time, when the wireless communication terminal receives the Intra-BSS frame, the wireless communication terminal may set or update the NAV for the intra-BSS frame based on the received Intra-BSS frame. In addition, when the frame received by the wireless communication terminal may not be determined as an Intra-BSS frame or an Inter-BSS frame, the wireless communication terminal may update the NAV for the inter-BSS frame based on the received frame. In addition, when the wireless communication terminal receives the Inter-BSS frame, the wireless communication terminal may set or update the NAV for the inter-BSS frame based on the received Inter-BSS frame. Accordingly, when the first BSSID is included in the multiple BSSID set including the second BSSID and the wireless communication terminal receives the frame transmitted from the BSS identified by the second BSSID, the wireless communication terminal may set or update the NAV for the Intra-BSS frame based on the frame transmitted in the BSS identified by the second BSSID. When the first BSSID is not included in any multiple BSSID set or the second BSSID is not included in the multiple BSSID set including the first BSSID and the wireless communication terminal receives the frame transmitted from the BSS identified by the second BSSID, the wireless communication terminal may set or update the NAV for the Inter-BSS frame based on the frame transmitted in the BSS identified by the second BSSID. In a specific embodiment, when the wireless communication terminal receives the CF-END frame from the OBSS, the wireless communication terminal may not reset the NAV set by the Intra-BSS frame. Therefore, when the first BSSID is included in the multiple BSSID set including the second BSSID, and the wireless communication terminal receives the CF-END frame transmitted from the BSS identified by the second BSSID, the wireless communication terminal may reset the NAV set by the Intra-BSS frame and maintain the NAV set by the Inter-BSS frame as before. When the first BSSID is not included in any of the multiple BSSID set or the second BSSID is not included in the multiple BSSID set including the first BSSID and the wireless communication terminal receives the CF-END frame transmitted from the BSS identified by the second BSSID, the wireless communication terminal may reset the NAV set by the inter-BSS frame and maintain the NAV set by the Intra-BSS frame as before. Specifically, the wireless communication terminal may operate as in the embodiment of FIGS. 8(b) and 8(c).

In the embodiment of FIG. 8(b), the twentieth station STA20 receives the PPDU transmitted from the first virtual access point VAP1. The BSSID identifying the BSS of the first virtual access point VAP1 is included in the multiple BSSID set including the BSSID identifying the BSS of the twentieth station STA20. Therefore, the twentieth station STA 20 sets the NAV for the Intra-BSS frame. At this time, the twentieth station STA20 receives the CF-END frame transmitted from the BSS (OBSS) other than the BSS operated by the first virtual access point VAP1 to the third virtual access point VAP3. The twentieth station STA20 does not reset the NAV for the Intra-BSS frame.

In the embodiment of FIG. 8(c), the twentieth station STA20 receives the PPDUs transmitted from the BSS (OBSS) other than the BSS operated by the first virtual access point VAP1 to the third virtual access point VAP3. At this time, the twentieth station STA20 sets the NAV based on the received PPDU. The twentieth station STA20 receives the CF-END frame from the first virtual access point VAP1. The BSSID identifying the BSS of the first virtual access point VAP1 is included in the multiple BSSID set including the BSSID identifying the BSS of the twentieth station STA20. Therefore, the twentieth station STA20 resets the NAV for the intra-BSS frame and does not reset the NAV for the inter-BSS frame.

When the wireless communication terminal receives the trigger frame for triggering the transmission of the wireless communication terminal, the wireless communication terminal may transmit a trigger-based PPDU based on the trigger frame regardless of the set NAV. Specifically, when the NAV of the wireless communication terminal is set by the access point that transmits the trigger frame, the wireless communication terminal may transmit trigger-based PPDU regardless of the set NAV. In another specific embodiment, when the response to the trigger frame includes an ACK frame and the length of the response is limited to less than the reference value, the wireless communication terminal may transmit the trigger-based PPDU regardless of the set NAV. In another specific embodiment, when the NAV of the wireless communication terminal is set by the Intra-BSS frame, the wireless communication terminal may transmit the trigger-based PPDU regardless of the set NAV. In another specific embodiment, when the BSSID of the BSS in which the frame for setting the NAV of the wireless communication terminal is transmitted and the BSSID of the BSS including the wireless communication terminal are included in the same multiple BSSID set, the wireless communication terminal may transmit the trigger-based PPDU regardless of the set NAV. Specifically, the wireless communication terminal may operate as in the embodiment of FIG. 8(d).

In the embodiment of FIG. 8(d), the twentieth station STA20 receives the PPDU transmitted by the first virtual access point VAP1. The BSSID identifying the BSS of the first virtual access point VAP1 is included in the multiple BSSID set including the BSSID identifying the BSS of the twentieth station STA20. Therefore, the twentieth station STA20 sets the NAV for the intra-BSS frame based on the received PPDU. The twentieth station STA20 receives the CF-END frame from the first virtual access point VAP1 but fails to decode the CF-END. The twentieth station STA20 receives the trigger frame from the second virtual access point VAP2. The NAV set in the twentieth station STA20 is set based on the PPDU transmitted by the first virtual access point AP and the BSSID identifying the BSS of the first virtual access point VAP1 is included in the multiple BSSID set including the BSSID identifying the BSS of the twentieth station STA20. Therefore, the twentieth station STA 20 may transmit the trigger-based PPDU regardless of the set NAV.

The wireless communication terminal may determine, based on the BSS color signaled in the physical layer of the received frame, whether the received frame is an Inter-BSS frame or an Intra-BSS frame. At this time, the BSS color is information for identifying the BSS. Specifically, when the BSS color identifying the BSS including the wireless communication terminal is the same as the BSS color signaled in the physical layer of the received frame, the wireless communication terminal may determine the received frame as an Intra-BSS frame. In addition, when the BSS color identifying the BSS including the wireless communication terminal and the BSS color signaled in the physical layer of the received frame are different, the wireless communication terminal may determine the received frame as an Inter-BSS frame. In addition, the wireless communication terminal may determine, based on the MAC address signaled in the MAC layer of the received frame, whether the received frame is an Inter-BSS frame or an Intra-BSS frame. Specifically, the wireless communication terminal may determine, based on the address field of the received frame, whether the received frame is an Inter-BSS frame or an Intra-BSS frame. When the MAC address signaled in the MAC layer matches the MAC address or the BSSID of the access point operating the BSS including the wireless communication terminal in the specific embodiment, the wireless communication terminal may determine the received frame as an Intra-BSS frame. At this time, the MAC address signaled in the MAC layer may include Individual/Group bit signaling indicating whether the MAC address is a group MAC address. In this case, the wireless communication terminal may determine that value excluding the Individual/Group bit from the MAC address signaled in the MAC layer matches the MAC address of the access point operating the BSS including the wireless communication terminal or the BSSID of the BSS including the wireless communication terminal.

Therefore, in order to consider a plurality of BSSs identified by each of the plurality of BSSIDs included in the same multiple BSSID set as the same BSS during the SR operation of the wireless communication terminal, it is necessary to determine the information related to the BSS color and the MAC address. Specifically, the wireless communication terminal compares the MAC address signaled in the MAC layer of the received frame with the multiple BSSID set including the BSSID of the BSS including the wireless communication terminal and determines whether the received frame is an Intra-BSS frame or an Inter-BSS frame. When the MAC address signaled in the MAC layer of the received frame is matched with any one of the plurality of BSSIDs included in the multiple BSSID set including the BSSID of the BSS including the wireless communication terminal in a specific embodiment, the wireless communication terminal may determine the received frame as an Intra-BSS frame. In another specific embodiment, when the MAC address signaled in the MAC layer of the received frame is not matched with any one of the plurality of BSSIDs included in the multiple BSSID set including the BSSID of the BSS including the wireless communication terminal, the wireless communication terminal may determine the received frame as an Inter-BSS frame. At this time, the wireless communication terminal may obtain information on the multiple BSSID set from the management frame as described above. Specifically, the information on the multiple BSSID set may be the multiple BSSID set elements described above.

In addition, a BSS corresponding to each of a plurality of BSSIDs included in the same multiple BSSID set may be set to the same BSS color. Specifically, each of the plurality of access points operating the BSS corresponding to each of the plurality of BSSIDs included in the same multiple BSSID set may set the BSS color values of the BSSs corresponding to the plurality of BSSIDs to be the same. At this time, a plurality of BSSs corresponding to the multiple BSSID set may be operated by one wireless communication terminal. In another specific embodiment, a BSS color corresponding to a plurality of BSSIDs included in a multiple BSSID set may be signaled. Specifically, the access point may signal a BSS color corresponding to a plurality of BSSIDs included in a multiple BSSID set. The BSS color setting method and the BSS color signaling method for multiple BSSID sets will be described with reference to FIGS. 9 to 12.

Figure 9:
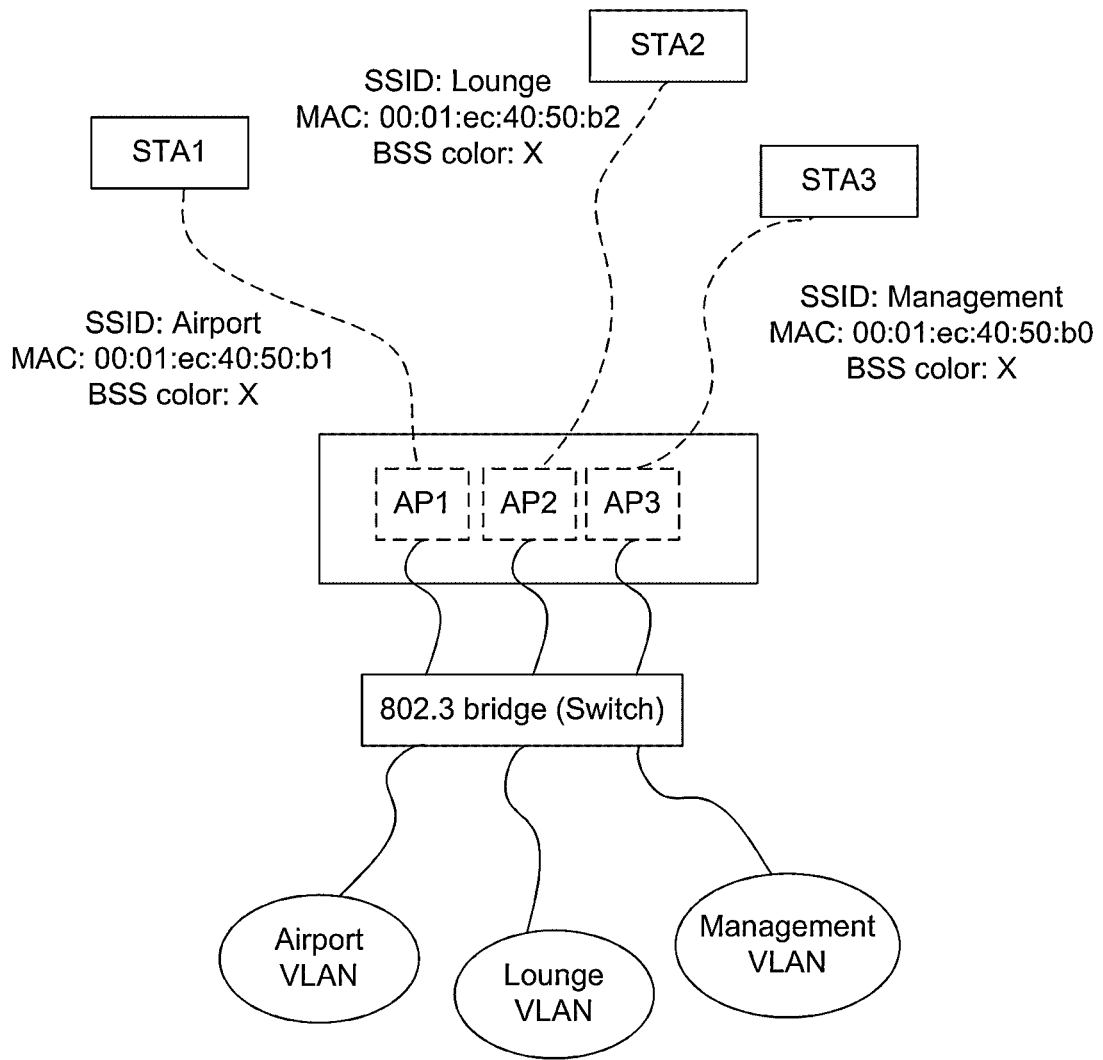
FIG. 9 shows a network for a virtual LAN according to an embodiment of the present invention.

FIG. 9 shows a network for a virtual LAN according to an embodiment of the present invention.

As described above, the BSS color values of a plurality of BSSs corresponding to the multiple BSSID set may all be set to be the same. At this time, the plurality of BSSs corresponding to the multiple BSSID set indicate a plurality of BSSs identified by the plurality of BSSIDs included in the multiple BSSID set. Specifically, a plurality of access points operating each of a plurality of BSSs corresponding to a plurality of BSSIDs may all set the same BSS color. The BSS color may be signaled through the signaling field of the physical layer. Specifically, the BSS color may be signaled through the HE-SIG-A field. As described above, the wireless communication terminal may perform the SR operation based on the BSS color. Specifically, the wireless communication terminal may access the channel based on the BSS color. In addition, the wireless communication terminal may perform a power save operation based on the BSS color.

In the embodiment of FIG. 9, the BSSs operated by the first virtual access point VAP1 to the third virtual access point VAP3 all have the same BSS color value X. All other settings of the network are the same as in FIG. 6. A specific power save operation will be described with reference to FIG. 10, and a specific CCA operation will be described with reference to FIG. 11 and FIG. 12.

Figure 10:
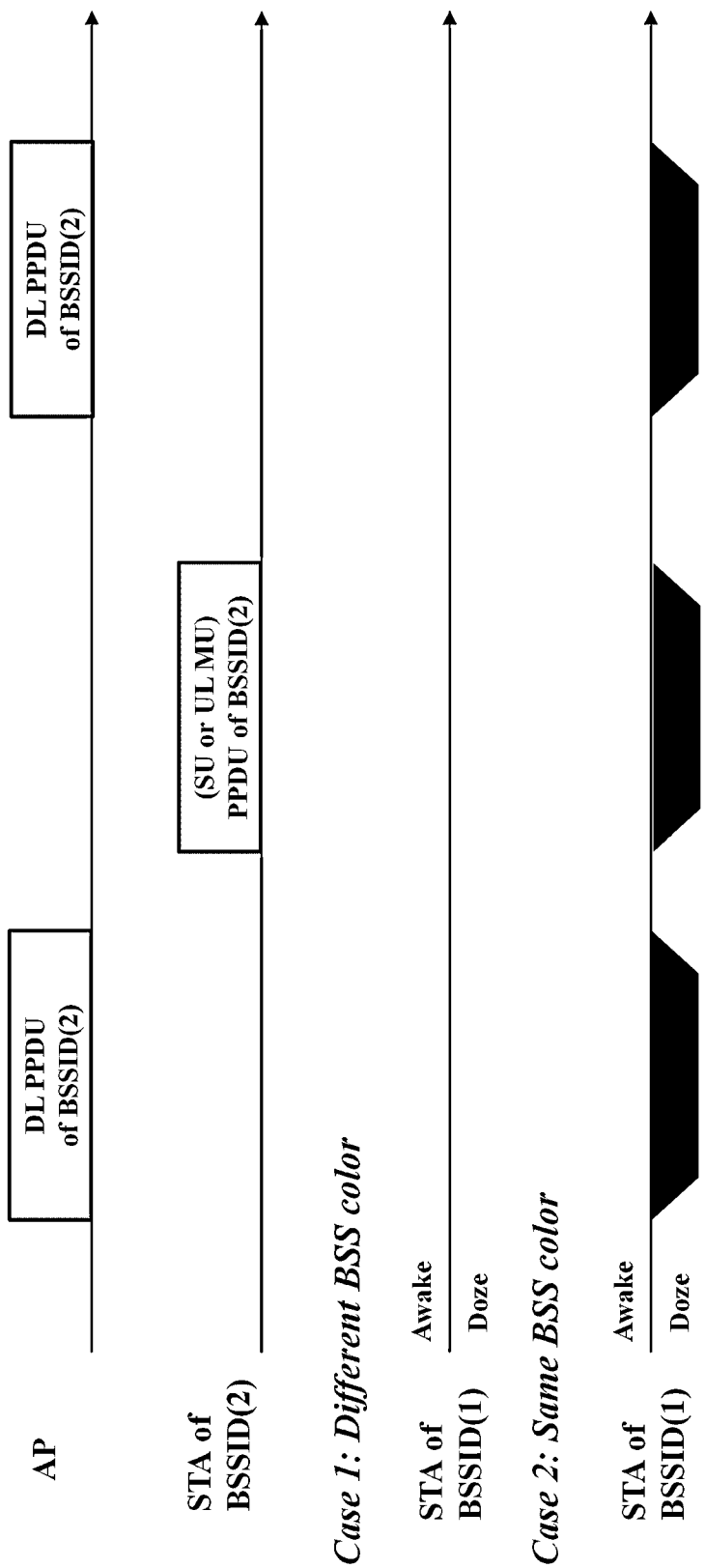
FIG. 10 shows a power save operation of a wireless communication terminal according to an embodiment of the present invention.

FIG. 10 shows a power save operation of a wireless communication terminal according to an embodiment of the present invention.

The wireless communication terminal may enter a power save state for power saving when the recipient of the Intra-BSS frame is not a wireless communication terminal. At this time, the power save state may be referred to as a doze state. Specifically, the power save state may indicate that some function is inactive for power saving. In a specific embodiment, when the frame received by the wireless communication terminal is an Intra-BSS frame and the recipient of the frame received by the wireless communication terminal is not a wireless communication terminal, the wireless communication terminal may enter the power save state. For example, when the BSS color signaled through the PPDU received by the wireless communication terminal is the same as the BSS color of the wireless communication terminal and the recipient of the frame included in the received PPDU is not the wireless communication terminal, the wireless communication terminal may enter the power save state.

In a case where the BSS color values of a plurality of BSSs corresponding to the multiple BSSID set are all set to be the same, even when the wireless communication terminal receives the PPDU transmitted from the BSS identified by the BSSID included in the multiple BSSID set that includes the BSSID of the BSS including the wireless communication terminal other than the BSS including the wireless communication terminal, the wireless communication terminal may enter the power save state.

In the embodiment of FIG. 10, the first case case 1 is the case where the BSS color values of a plurality of BSSs corresponding to the multiple BSSID set are not all set to be the same, and the second case case 2 is the case where the BSS color values of a plurality of BSSs corresponding to the multiple BSSID set are all set to be the same. At this time, the access point AP operating the BSS identified by the second BSSID BSSID(2) and the station STA of BSSID(2) included in the BSS identified by the second BSSID BSSID (2) transmit/receive PPDUs. At this time, the station STA of BSSID(1) included in the BSS identified by the first BSSID BSSID(1) other than the second BSSID BSSID(2) may not enter a power save state in the first case Case 1. However, the station STA of BSSID(1) included in the BSS identified by the first BSSID BSSID(1) that is not the second BSSID BSSID(2) may check the BSS color signaled by the PPDU and enter the power save state in the second case Case 2. The wireless communication terminal may increase the power efficiency when a multiple BSSID set is used through this operation.

Figure 11:
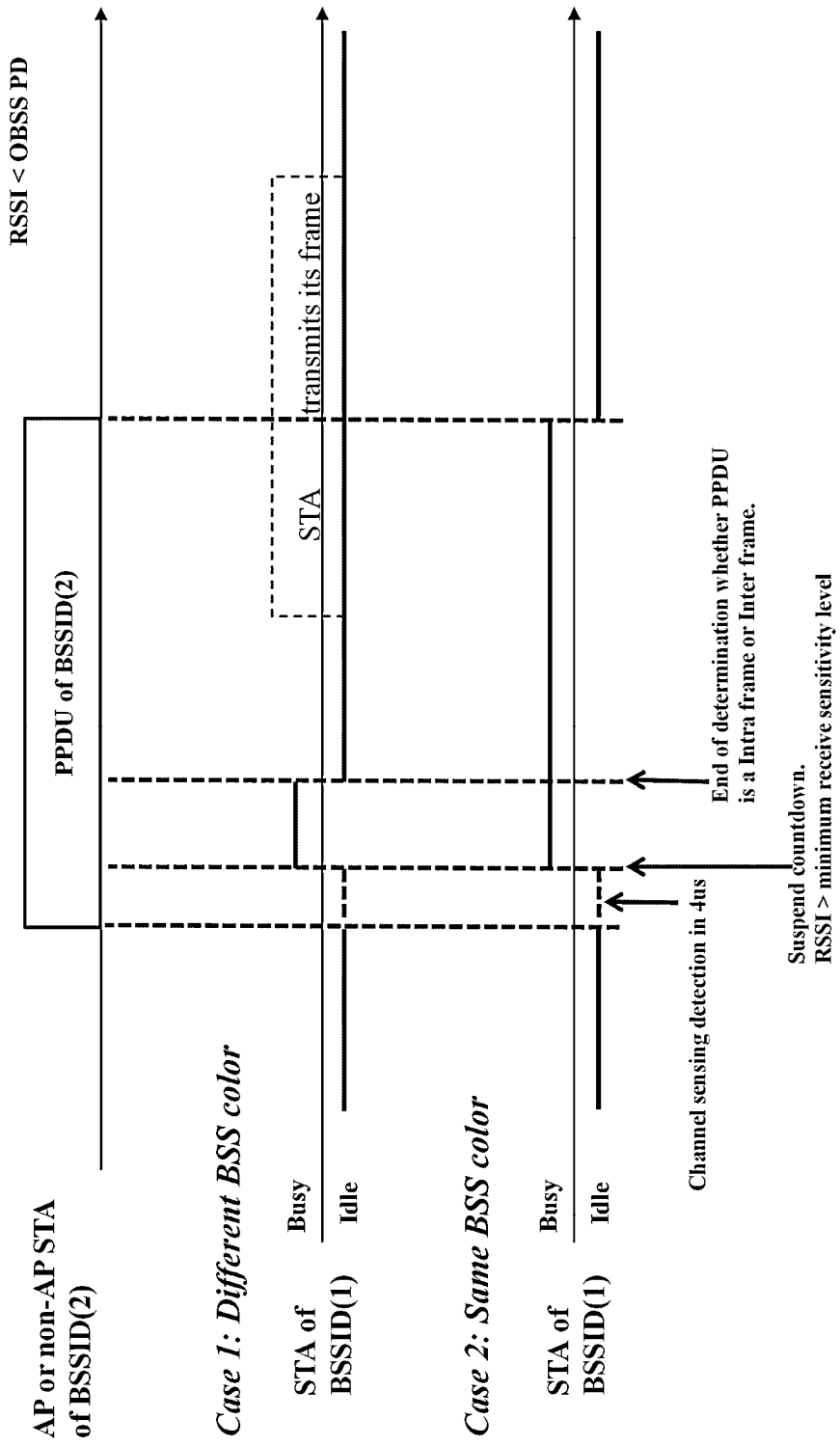
FIG. 11 shows the channel access operation of a wireless communication terminal according to an embodiment of the present invention.

FIG. 11 shows the channel access operation of a wireless communication terminal according to an embodiment of the present invention.

As described above, the wireless communication terminal may adjust the CCA threshold value according to whether the received frame is an Inter-BSS frame or an Intra-BSS frame. Specifically, when the received frame is an Inter-BSS frame, the wireless communication terminal may apply the OBSS CCA level not the general CCA level as the CCA threshold value. At this time, the OBSS CCA level may be a value which is equal to or greater than the general CCA level. For convenience of explanation, the BSSID of the BSS including the wireless communication terminal is referred to as a first BSSID, and a BSSID other than the first BSSID is referred to as a second BSSID. When the BSS color values of the plurality of BSSs corresponding to the multiple BSSID set are all set to be the same and the first BSSID is included in the multiple BSSID set including the second BSSID, even when the wireless communication terminal receives the PPDU transmitted from the BSS identified by the second BSSID, the general CCA level, not the OBSS CCA level, may be applied as the CCA threshold value. A specific operation of a wireless communication terminal will be described with reference to FIG. 11.

In the embodiment of FIG. 11, the first case case 1 is the case where the BSS color values of a plurality of BSSs corresponding to the multiple BSSID set are not all set to be the same, and the second case case 2 is the case where the BSS color values of a plurality of BSSs corresponding to the multiple BSSID set are all set to be the same. At this time, the PPDU is transmitted from the BSS identified by the second BSSID BSSID(2). At this time, the station STA of BSSID(1) included in the BSS identified by the first BSSID BSSID(1) that is not the second BSSID BSSID(2) determines the BSS color signaled by the PPDU. Specifically, the station STA of BSSID(1) included in the BSS identified by the first BSSID BSSID(1) may obtain the BSS color from the signaling field of the PPDU. At this time, the signaling field may be the HE-SIG-A field. In the first case Case 1, since the BSS color obtained from the signaling field of the PPDU differs from the BSS color of the BSS identified by the first BSSID BSSID(1) in the station STA of BSSID(1) included in the BSS identified by the first BSSID BSSID(1), the station STA of BSSID(1) included in the BSS identified by the first BSSID BSSID(1) applies the OBSS PD CCA level to the CCA threshold value. Since the received signal strength (RSSI) value is less than the OBSS PD CCA level, the station STA of BSSID(1) included in the BSS identified by the first BSSID BSSID(1) accesses the channel. Specifically, the station STA of BSSID(1) included in the BSS identified by the first BSSID BSSID(1) determines that the channel is idle. In the first case Case 2, since the BSS color obtained from the signaling field of the PPDU is the same as the BSS color of the BSS identified by the first BSSID BSSID(1) in the station STA of BSSID(1) included in the BSS identified by the first BSSID BSSID(1), the station STA of BSSID(1) included in the BSS identified by the first BSSID BSSID(1) applies the general PD CCA level to the CCA threshold value. Since the received signal strength (RSSI) value is greater than general CCA level, the station STA of BSSID(1) included in the BSS identified by the first BSSID BSSID(1) does not access the channel. Specifically, the station STA of BSSID(1) included in the BSS identified by the first BSSID BSSID(1) determines that the corresponding channel is busy. Through this operation, the wireless communication terminal may prevent a transmission collision between BSSs corresponding to the same multiple BSSID set.

In addition, as described above, the wireless communication terminal may determine, based on the MAC address signaled in the MAC layer of the received frame, whether the received frame is an Inter-BSS frame or an Intra-BSS frame. Particularly, when a legacy PPDU in which the BSS color is not signaled in the physical layer is transmitted, the wireless communication terminal may determine, based on the MAC address signaled in the MAC layer of the received frame, whether the received frame is an Inter-BSS frame or an Intra-BSS frame. At this time, the wireless communication terminal may regard a plurality of BSSs corresponding to the same multiple BSSID as the same BSS as described above.

When the BSS color values of a plurality of BSSs corresponding to the multiple BSSID set are all set to be the same, the system complexity may be reduced as compared with the case of signaling a BSS color corresponding to a plurality of BSSIDs included in a multiple BSSID set. In addition, the range of values that the BSS color may have may be smaller than the range of values that the BSSID may have. At this time, when the BSS color values of the plurality of BSSs corresponding to the multiple BSSID set are all set to be the same, it is possible to reduce the case where different BSSs do not correspond to the same multiple BSSID set but have the same BSS color value.

In another specific embodiment, when the specified BSS color is signaled in the physical layer of the received frame, the wireless communication terminal may determine, based on the MAC address signaled in the MAC layer, whether the received frame is an Inter-BSS frame or an Intra-BSS frame.

Figure 12:
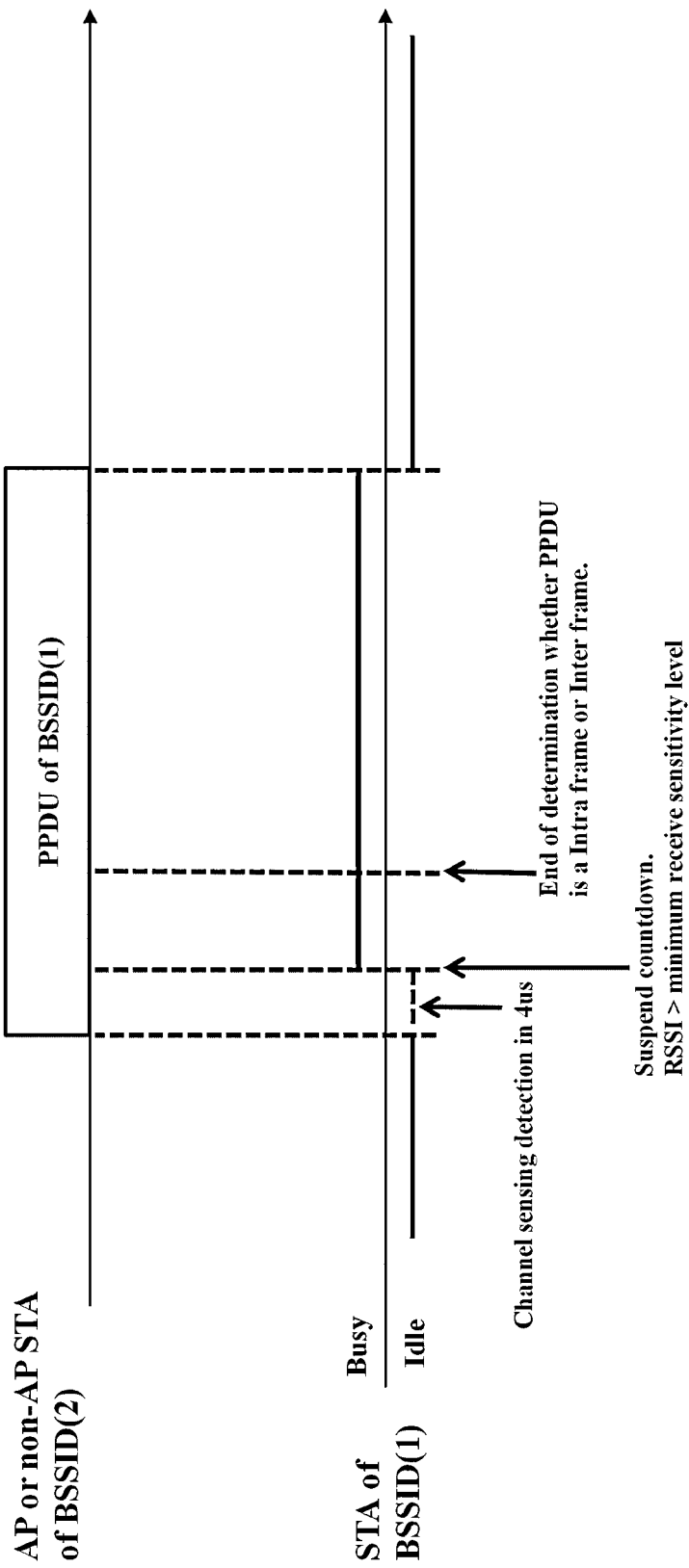
FIG. 12 shows the channel access operation of a wireless communication terminal according to another embodiment of the present invention.

FIG. 12 shows the channel access operation of a wireless communication terminal according to another embodiment of the present invention.

For convenience of explanation, the BSSID of the BSS including the wireless communication terminal is referred to as a first BSSID, and the first BSSID and a different BSSID are referred to as a second BSSID. When the first BSSID is included in the multiple BSSID set including the second BSSID and the wireless communication terminal receives the PPDU transmitted from the BSS identified by the second BSSID, the wireless communication terminal may not access the corresponding channel regardless of the received signal strength. Specifically, the wireless communication terminal may not access the corresponding channel while the PPDU transmitted from the BSS identified by the second BSSID is transmitted. At this time, the wireless communication terminal may enter the power save state. Also, the wireless communication terminal may determine that the channel state is busy until it determines whether the received PPDU is an Inter-BSS frame or an Intra-BSS frame.

In the embodiment described in FIG. 11, the wireless communication terminal may determine whether to access the channel according to the received signal strength. However, there is a high possibility that a plurality of BSSs corresponding to the multiple BSSID set are operated by one wireless communication terminal. Therefore, while the PPDU transmitted from the BSS identified by the second BSSID is transmitted, even when the wireless communication terminal accesses the channel and transmits data, the access point of the BSS including the wireless communication terminal may not receive the PPDU. Finally, while the PPDU transmitted from the BSS identified by the second BSSID is transmitted regardless of the strength of the received signal, it may be effective to restrict the transmission of the wireless communication terminal.

In the embodiment of FIG. 12, a PPDU is transmitted from the BSS identified by the second BSSID BSSID(2). At this time, the station STA of BSSID(1) included in the BSS identified by the first BSSID BSSID(1) that is not the second BSSID BSSID(2) determines the BSS color signaled by the PPDU. Specifically, the station STA of BSSID(1) included in the BSS identified by the first BSSID BSSID(1) may obtain the BSS color from the signaling field of the PPDU. Since the BSS color obtained from the signaling field of the PPDU is the same as the BSS color of the BSS identified by the first BSSID BSSID(1) in the station STA of BSSID(1) included in the BSS identified by the first BSSID BSSID(1), the station STA of BSSID(1) included in the BSS identified by the first BSSID BSSID(1) does not access the corresponding channel regardless of the received signal strength value. Specifically, the station STA of BSSID(1) included in the BSS identified by the first BSSID BSSID(1) determines that the corresponding channel is busy regardless of received signal strength value. Through this operation, the wireless communication terminal may prevent a transmission collision between BSSs corresponding to the same multiple BSSID set.

Figure 13:
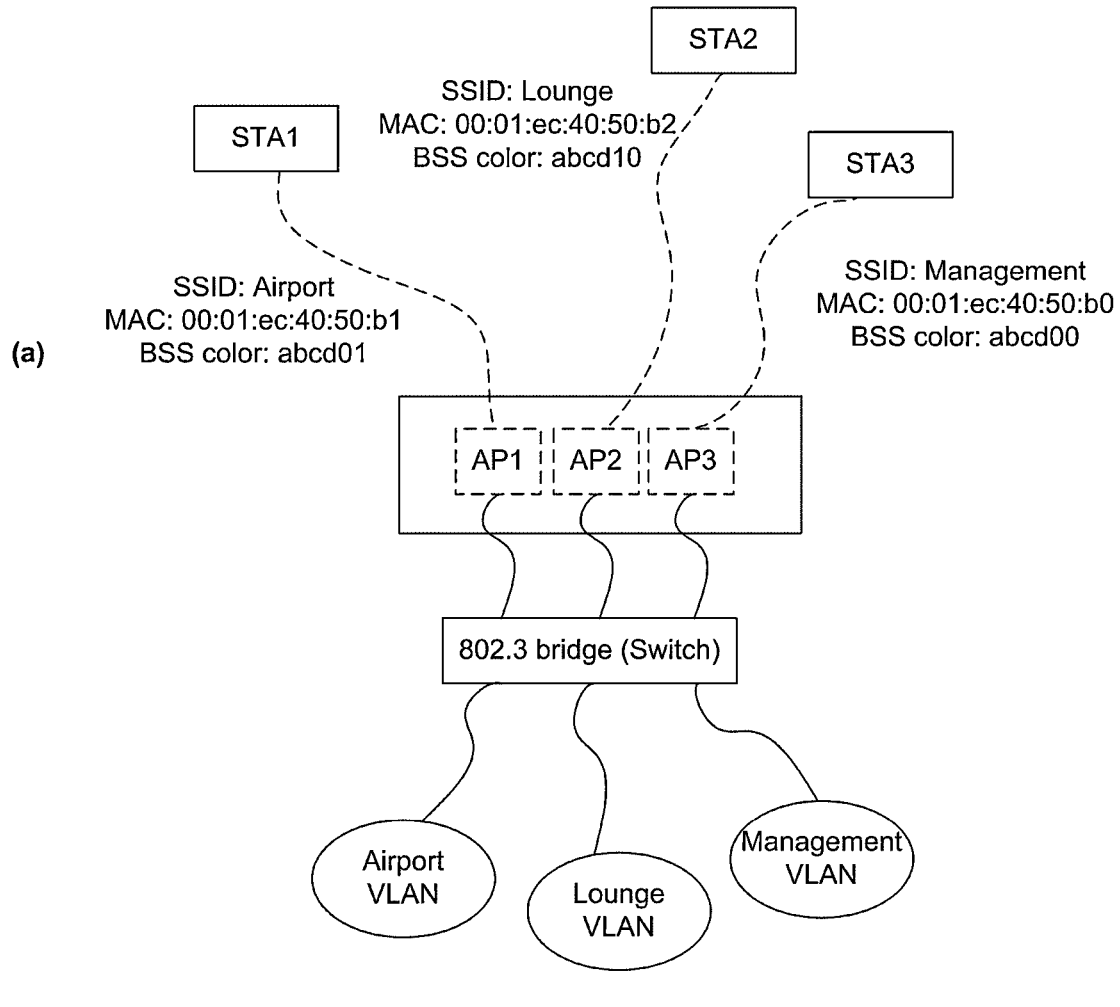
FIG. 13 shows a method of setting BSS color values of a plurality of BSSs corresponding to a multiple BSSID set according to an embodiment of the present invention.

FIG. 13 shows a method of setting BSS color values of a plurality of BSSs corresponding to a multiple BSSID set according to an embodiment of the present invention.

The BSS colors of the plurality of BSSs corresponding to the multiple BSSID set may be set to different values. The plurality of access points operating each of the plurality of BSSs corresponding to the multiple BSSID set may set the BSS color values of the plurality of BSSs corresponding to the multiple BSSID set differently. In a specific embodiment, only some of a plurality of BSSs corresponding to a multiple BSSID set may be set to different BSS color values. At this time, the wireless communication terminal of the BSS corresponding to the multiple BSSID set may determine whether the recipient of the received PPDU is a wireless communication terminal by decoding the signaling field of the physical layer. Accordingly, the wireless communication terminal may determine that the recipient of the PPDU, which is received faster than the case where the BSS color values of the plurality of BSSs corresponding to the multiple BSSID set are set to be the same in the received PPDU, is the wireless communication terminal. When the recipient of the received PPDU is not a wireless communication terminal, the wireless communication terminal may stop decoding. At this time, the wireless communication terminal may not access the corresponding channel based on at least one of the PPDU length, the TXOP length, and the bandwidth of the PPDU in order to protect the PPDU being transmitted.

At this time, the access point may explicitly signal BSS color values of a plurality of BSSs corresponding to a multiple BSSID set. In another specific embodiment, the BSS color values for a plurality of BSSs corresponding to the multiple BSSID set may be set according to predetermined rules. Specifically, in the BSS color values of a plurality of BSSs corresponding to multiple BSSID, one or more bit values corresponding to the same position may be the same. For example, in the BSS color values of a plurality of BSSs corresponding to a multiple BSSID set, n MSBs may be the same. For example, in the BSS color values of a plurality of BSSs corresponding to a multiple BSSID set, n LSBs may be the same. In a specific embodiment, the value of n may be determined according to the number of BSSIDs included in the multiple BSSID set.

In FIG. 13(a), the three BSSs corresponding to the multiple BSSID set have different BSS color values. All other settings of the network are the same as in FIG. 9. At this time, the BSS color value may be indicated by 6 bits as shown in FIG. 13(b). Therefore, the BSS color value may be in the range of 0 to 63. At this time, in the BSS color values of a plurality of BSSs corresponding to the same multiple BSSID set, n MSBs are the same.

In addition, a plurality of access points, each operating a plurality of BSSs corresponding to a multiple BSSID set, may set BSS color values of a plurality of BSSs corresponding to a multiple BSSID set based on a BSSID value. Specifically, a plurality of access points, each operating a plurality of BSSs corresponding to a plurality of BSSIDs, may set a LSB as a BSS color value as many as the number of bits that the BSS color value may have in the BSSID value. At this time, the wireless communication terminal may obtain the LSBs as many as the number of bits that the BSS color value may have from the bit value of the BSSID as the BSS color value corresponding to the BSSID. That is, the wireless communication terminal may obtain the BSS color value corresponding to the BSSID by BSSID % $2^n$. In this case, when the wireless communication terminal does not have the BSSID included in the multiple BSSID set, it may obtain the BSS color value corresponding to each BSSID. Therefore, no separate signaling is required for the BSS color values of the plurality of BSSs corresponding to the multiple BSSID set.

In another specific embodiment, a plurality of access points, operating each of a plurality of BSSs corresponding to a multiple BSSID set, may set a BSS color value corresponding to a multiple BSSID set based on the reference BSSID. Specifically, the plurality of access points, operating each of the plurality of BSSs corresponding to a multiple BSSID, sets a value obtained by adding a difference between a reference BSSID and a corresponding BSSID to a BSS color value corresponding to the reference BSSID of a multiple BSSID set, as a color value corresponding to the corresponding BSSID.

As described above, the range of a value that the BSS color may have may be less than the range of values that the BSSID may have. At this time, when the BSS color values of the plurality of BSSs corresponding to the multiple BSSID set are all set differently, it is more possible that BSSs that do not correspond to the same multiple BSSID set and are different from each other have the same BSS color value. Therefore, when BSS color values of a plurality of BSSs corresponding to the multiple BSSID set are all set differently, the wireless communication terminal may perform the SR operation after checking the MAC address signaled in the MAC layer of the received frame. At this time, the wireless communication terminal may determine, based on the MAC address signaled in the MAC layer of the received frame, whether the received frame is an Inter-BSS frame or an Intra-BSS frame. In addition, the SR operation may include at least one of the channel access operation and the power save operation described above.

As described above, the wireless communication terminal may determine, based on the MAC address, whether the received frame is an Inter-BSS frame or an Intra-BSS frame. At this time, a specific method of determining whether the frame received by the wireless communication terminal is an Inter-BSS frame or an Intra-BSS frame and a power save operation of the wireless communication terminal will be described with reference to FIG. 14 through FIG. 15.

Figure 14:
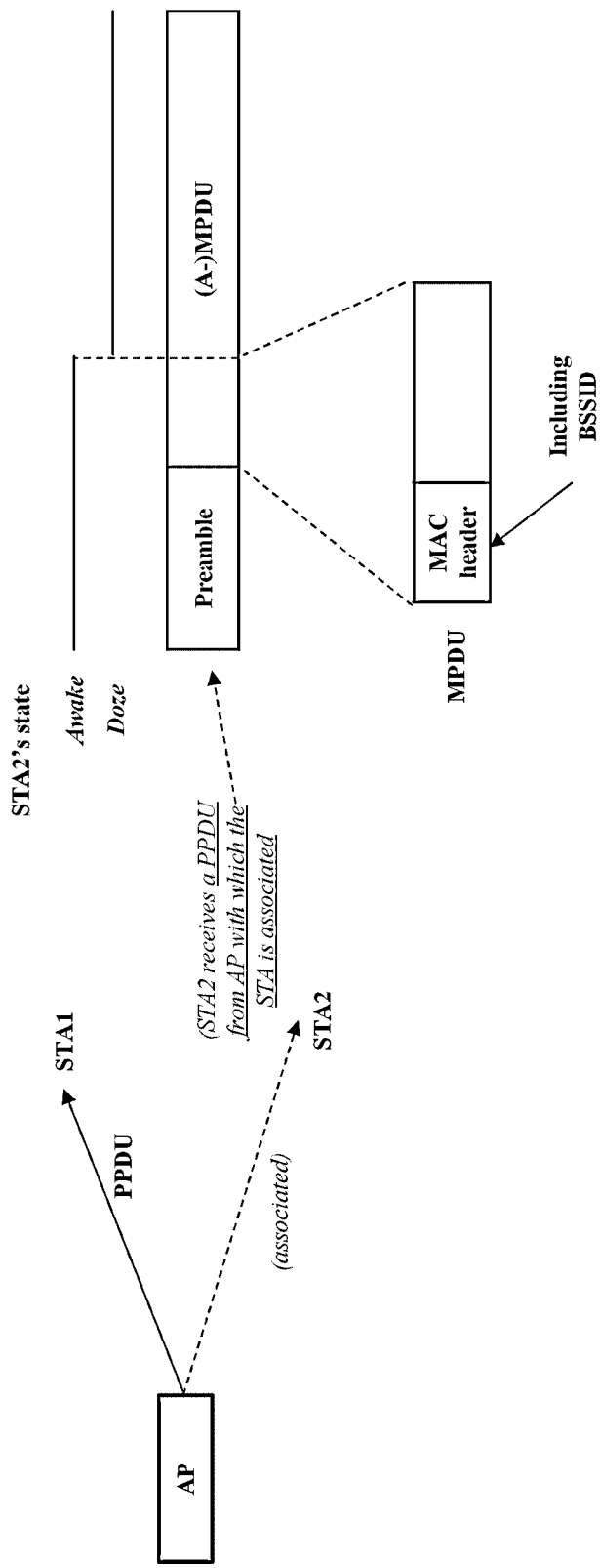
FIG. 14 shows a case where a wireless communication terminal according to an embodiment of the present invention enters a power save state based on a MAC header of a frame received by the wireless communication terminal.
Figure 15:
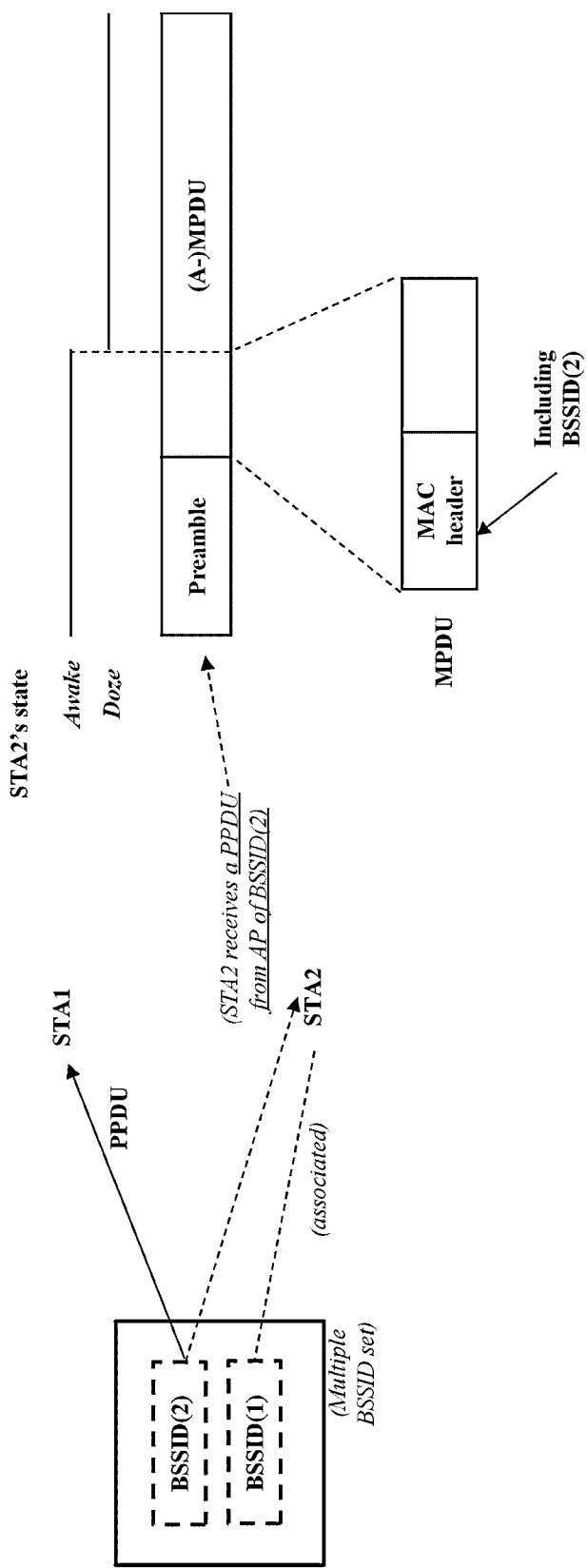
FIG. 15 shows a case where, when a wireless communication terminal according to an embodiment of the present invention is included in a BSS corresponding to a multiple BSSID set, the wireless communication terminal enters a power save state based on a MAC header of a frame received by the wireless communication terminal.

FIG. 14 shows a case where a wireless communication terminal according to an embodiment of the present invention enters a power save state based on a MAC header of a frame received by the wireless communication terminal. Also, FIG. 15 shows a case where, when a wireless communication terminal according to an embodiment of the present invention is included in a BSS corresponding to a multiple BSSID set, the wireless communication terminal enters a power save state based on a MAC header of a frame received by the wireless communication terminal.

When a Transmitter Address TA or a Receiver Address RA indicated by a MAC header of a received frame corresponds to another BSSID of a multiple BSSID set that includes a BSSID of a BSS including a wireless communication terminal, the wireless communication terminal may determine the received frame as an Intra-BSS frame. When the frame received by the wireless communication terminal is an Intra-BSS frame and the wireless communication terminal is not a recipient of a received frame, the wireless communication terminal may enter the power save state. At this time, the wireless communication terminal may maintain the power save state until the end of the duration of the PPDU including the received frame.

In the embodiment of FIG. 14, the first station STA1 and the second station STA2 are associated with the same access point AP. When the access point AP transmits a PPDU to the first station STA1, the second station STA2 may receive the PPDU. At this time, the second station STA2 determines whether the received PPDU is an intra-BSS frame. When the received PPDU is an Intra-BSS frame, the second station STA2 determines whether the recipient of the received PPDU is the second station STA2. Specifically, the second station STA2 may determine, based on the MAC header, whether the recipient of the received PPDU is the second station STA2. At this time, when the second station STA2 is not the recipient of the received PPDU, the second station STA2 may enter the power save state.

When entering the power save state, the wireless communication terminal may determine whether the Receiver Address RA of the frame indicates a plurality of wireless communication terminals including the corresponding wireless communication terminal. Specifically, when the received frame is an Intra-BSS frame, the Receiver Address RA of the received frame is not the MAC address of the wireless communication terminal, and the Receiver Address RA of the received frame does not correspond to the broadcast address, the wireless communication terminal may enter the power save state. At this time, when the Receiver Address RA of the received frame does not correspond to the multicast address that the wireless communication terminal should receive and the Receiver Address (RA) of the received frame does not correspond to the group address that the wireless communication terminal should receive, the wireless communication terminal may enter the power save state.

In a specific embodiment, even when the Receiver Address RA of the trigger frame or the Receiver Address RA of a multi-station block ACK (Multi-STA BlockACK) frame does not match the MAC address of the wireless communication terminal, the wireless communication terminal may need to receive a trigger frame or a multi-station block ACK frame. Specifically, when the recipient of the trigger frame is a plurality of wireless communication terminals, the Receiver Address RA of the trigger frame may be a broadcast address. At this time, the number of User Info fields of the trigger frame may be two or more. Also, when the recipient of the multi-station block ACK frame is a plurality of wireless communication terminals, the Receiver Address RA of the multi-station block ACK may be a broadcast address. At this time, the number of AID fields in the Per STA Info subfield of the multi-station block ACK may be two or more. At this time, the broadcast address may indicate a plurality of wireless communication terminals or one wireless communication terminal.

Accordingly, when the received frame is an Intra-BSS frame, the Receiver Address RA of the received frame is not the MAC address of the wireless communication terminal, the received frame is a trigger frame, and the Receiver Address RA of the received frame does not correspond to the broadcast address, the wireless communication terminal may enter the power save state. In addition, when the received frame is an Intra-BSS frame, the Receiver Address RA of the received frame is not the MAC address of the wireless communication terminal, the received frame is a trigger frame, and the Receiver Address RA of the multi-station block ACK frame does not correspond to the broadcast address, the wireless communication terminal may enter the power save state.

Specifically, when the recipient of the trigger frame or the multi-station block ACK frame is a plurality of wireless communication terminals, the Receiver Address RA may be a multicast address or a group address. Therefore, when the wireless communication terminal receives the trigger frame or the multi-station block ACK frame and the Receiver Address RA of the received frame is not a multicast address and a group address including the wireless communication terminal, the wireless communication terminal may enter the power save state.

When any one of the BSSIDs included in the multiple BSSID set is set to the Receiver Address RA of the frame or the Transmitter Address TA of the frame, only the wireless communication terminal included in the BSS identified by the corresponding BSSID may be a recipient or a transmitter of the corresponding frame. Specifically, for a frame transmitted to a plurality of wireless communication terminals included in each of two or more BSSs corresponding to a multiple BSSID set, a modified value may be set based on the BSSID in the Transmitter Address of the frame. At this time, the wireless communication terminal may not separately determine whether the Receiver Address RA and the Transmitter Address TA are the broadcast address or the multicast address including the address of the wireless communication terminal. For convenience of explanation, the BSSID of the BSS including the wireless communication terminal is referred to as a first BSSID, and a different BSSID other than the first BSSID is referred to as a second BSSID. Specifically, when the second BSSID is included in the multiple BSSID set including the first BSSID and the Receiver Address RA or the Transmitter Address TA of the frame received by the wireless communication terminal matches the second BSSID, the wireless communication terminal may enter the power save state.

In the embodiment of FIG. 15, the multiple BSSID set includes a first BSSID BSSID(1) and a second BSSID BSSID(2). The first station STA1 is included in the BSS identified by the second BSSID BSSID(2) and the second station STA2 is included in the BSS identified by the first BSSID BSSID(1). At this time, the virtual access point having the second BSSID BSSID(2) transmits the PPDU to the first station STA1. The second station STA2 receives the corresponding PPDU. The second station STA2 determines whether the received PPDU is an intra-BSS frame. Specifically, the second station STA2 may determine whether the MAC address signaled by the MAC header of the received PPDU is the BSSID of the multiple BSSID set including the first BSSID. Since the Transmitter Address TA of the received PPDU is the second BSSID BSSID(2), the second station STA2 determines the received PPDU as an intra-BSS frame. Also, since the recipient of the received PPDU is a wireless communication terminal included in the BSS identified by the second BSSID BSSID(2), the second station STA2 enters the power save state.

When the received PPDU is an Inter-BSS frame, the second station STA2 determines whether the recipient of the received PPDU is the second station STA2. Specifically, the second station STA2 may determine whether the recipient of the PPDU received based on the MAC header is the second station STA2. At this time, when the second station STA2 is not the recipient of the received PPDU, the second station STA2 may enter the power save state.

In another specific embodiment, when the reference BSSID is set to the Transmitter Address (TA) of the frame, it may indicate that the Transmitter Address TA is transmitted to a plurality of wireless communication terminals included in two or more BSSs corresponding to the multiple BSSID set. When the second BSSID is included in the multiple BSSID set including the first BSSID, the second BSSID is not the reference BSSID, and the Receiver Address RA or the Transmitter Address TA of the frame received by the wireless communication terminal indicates that the frame is transmitted from the second BSSID, the wireless communication terminal may enter the power save state.

When a multiple BSSID set is used, a wireless communication terminal may increase the efficiency of transmission of other types of frame as well as a management frame. This will be described with reference to FIGS. 16 to 18.

Figure 16:
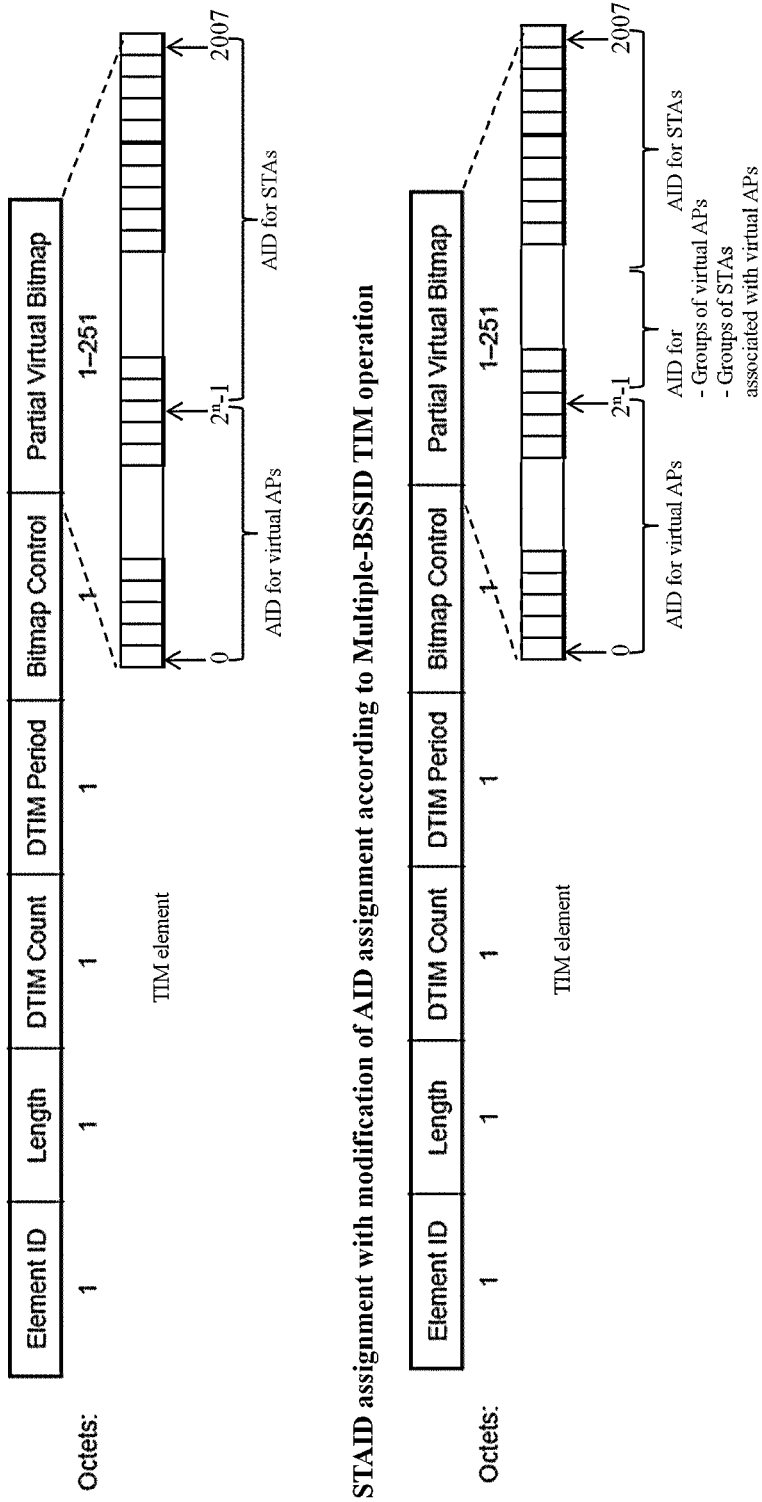
FIG. 16 shows a method of displaying an identifier of a wireless communication terminal included in a plurality of BSSs corresponding to a multiple BSSID set according to an embodiment of the present invention.

FIG. 16 shows a method of displaying an identifier of a wireless communication terminal included in a plurality of BSSs corresponding to a multiple BSSID set according to an embodiment of the present invention.

The wireless communication terminal may signal the wireless communication terminal to receive data by using the signaling field of the physical layer. Specifically, the wireless communication terminal may signal a wireless communication terminal to receive data through transmission using the MU-MIMO by using the signaling field of the physical layer. Also, the wireless communication terminal may signal a wireless communication terminal to receive data by using a Traffic Indicator Map (TIM). In this case, a method of signaling one or a plurality of wireless communication terminals included in the BSS corresponding to multiple BSSIDs may be a problem.

The wireless communication terminal may signal a plurality of wireless communication terminals included in the BSS corresponding to multiple BSSIDs using a bitmap. Each bit of the bitmap indicates a wireless communication terminal, and when the value of the bit is 1, the bitmap signals a wireless communication terminal corresponding to the corresponding bit. At this time, the bitmap may be mapped to an Association identifier (AID) of the wireless communication terminal. Also, a plurality of wireless communication terminals operating a plurality of BSSs corresponding to the multiple BSSID set may allocate bits of the bitmap from 0 to X to a plurality of wireless communication terminals included in a plurality of BSSs corresponding to the multiple BSSID set. In this case, X may be a value obtained by subtracting 1 from the maximum value of the BSSID that may be included in the multiple BSSID set. Specifically, X may be $2^n-1$, and n may be the value of the MaxBSSID indicator field described above. At this time, when signaling a plurality of wireless communication terminals included in any one of the plurality of BSSs corresponding to the multiple BSSID set, the wireless communication terminal may set the bit of the association identifier of the wireless communication terminal operating the corresponding BSS to 1. At this time, the specific form of the bitmap may be the same as that of the embodiment of FIG. 16(a). In addition, a specific bit of the bitmap may indicate all wireless communication terminals included in a plurality of BSSs corresponding to a multiple BSSID set. At this time, the specific bit may be a bit corresponding to the association identifier 2007.

When using the method described above, the wireless communication terminal should signal all the wireless communication terminals included in one of the plurality of BSSs corresponding to the multiple BSSID set or signal all wireless communication terminals included in the plurality of BSSs corresponding to the multiple BSSID set. Therefore, the combination of wireless communication terminals that a wireless communication terminal may signal may be limited. Accordingly, the wireless communication terminal may allocate some bits of the bit map described above as group bits indicating the group of wireless communication terminals. At this time, the group may be a group including some BSSs among a plurality of BSSs corresponding to a multiple BSSID set. Also, the group may be a group including some of a plurality of wireless communication terminals included in a plurality of BSSs corresponding to the multiple BSSID set. At this time, the specific form of the bitmap may be the same as that of the embodiment of FIG. 16(a).

Also, the wireless communication terminal may use the AID allocation method of the multiple BSSID TIM operation to reduce the bitmap size. Specifically, the Bitmap Control field of FIGS. 16(a) and 16(b) may be utilized. Further, when the maximum number of groups that the wireless communication terminal may use is limited, it is possible to transmit a bitmap allocatable to a group and not to transmit a bitmap corresponding to the remaining association identifier. The wireless communication terminal may transmit the bitmap through an association response frame and a reassociation response frame. Further, the wireless communication terminal may signal the information on the group through the management frame or the action frame. Specifically, the wireless communication terminal may signal an association identifier corresponding to a group through an association response frame and a reassociation response frame.

Figure 17:
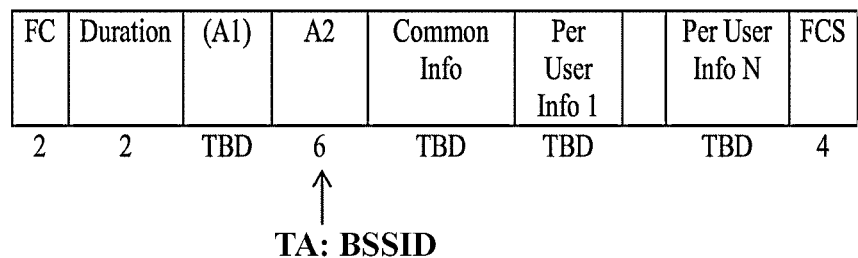
FIG. 17 shows a trigger frame format according to an embodiment of the present invention.

FIG. 17 shows a trigger frame format according to an embodiment of the present invention.

The wireless communication terminal may trigger the transmission of a plurality of wireless communication terminals by transmitting a trigger frame. The specific format of the trigger frame may be the same as that of the embodiment of FIG. 17. The trigger frame may include a Transmitter Address field A2 indicating a Transmitter Address, which is the address of a wireless communication terminal that transmits the trigger frame. Since the case where a wireless communication terminal operating a BSS transmits a trigger frame is general, it is general that the Transmitter Address of the trigger frame is set to the BSSID of BSS from which the trigger frame is transmitted.

The wireless communication terminal may trigger the transmission of a plurality of wireless communication terminals included in a plurality of BSSs corresponding to the multiple BSSID set through one trigger frame. Specifically, the wireless communication terminal may trigger the transmission of a plurality of wireless communication terminals included in a plurality of BSSs corresponding to the multiple BSSID set by setting the Transmitter Address of the trigger frame to the reference BSSID. However, in this embodiment, a case of triggering a plurality of wireless communication terminals included in a BSS corresponding to a reference BSSID and a case of triggering a plurality of wireless communication terminals included in a plurality of BSSs corresponding to a multiple BSSID set may not be distinguished from each other. To prevent this, the wireless communication terminal may set the Individual/Group of the reference BSSID to 1. Therefore, the wireless communication terminal may set the reference BSSID in which Individual/Group is 1 as the Transmitter Address to trigger the transmission of the plurality of wireless communication terminals included in the plurality of BSSs corresponding to the multiple BSSID set.

In another specific embodiment, the wireless communication terminal sets a value of n LSBs set to 0 in the reference BSSID as a Transmitter Address to trigger the transmission of a plurality of wireless communication terminals included in a plurality of BSSs corresponding to the multiple BSSID set. In this case, n may be the value of the MaxBSSID indicator field described above. However, when there is a BSS having a value of n LSBs set to 0 in the reference BSSID as a BSSID, confusion may occur with respect to the BSS indicated by the Transmitter Address.

Figure 18:
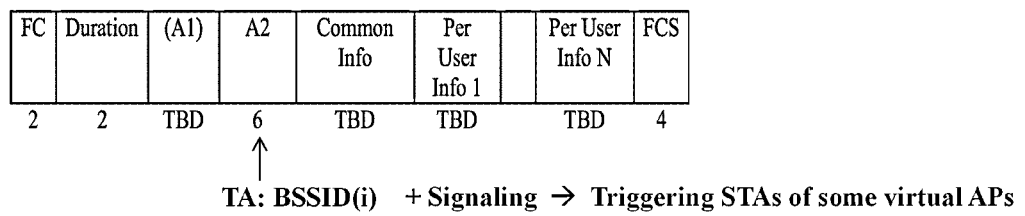
FIG. 18 shows a trigger frame format according to another embodiment of the present invention.

FIG. 18 shows a trigger frame format according to another embodiment of the present invention.

In the embodiment of FIG. 17, when the Transmitter Address of the trigger frame indicates a plurality of BSSs corresponding to a multiple BSSID set, it is necessary to check that all the wireless communication terminals included in the plurality of BSSs corresponding to the multiple BSSID set trigger the transmission of the corresponding wireless communication terminal by the trigger frame. The wireless communication terminal signals a BSS including a terminal triggered through a Transmitter Address of a trigger frame to trigger the transmission of a wireless communication terminal included in some of a plurality of BSSs corresponding to a multiple BSSID set. Specifically, the wireless communication terminal may set the Transmitter Address of the trigger frame to any one of a plurality of BSSIDs included in the multiple BSSID set. Through this, the wireless communication terminal may trigger the transmission of a plurality of wireless communication terminals included in the BSS identified by the BSSID having a value larger than the corresponding BSSID among the plurality of BSSIDs included in the multiple BSSID set. In another embodiment, the wireless communication terminal may trigger the transmission of a plurality of wireless communication terminals included in the BSS identified by the BSSID having a value smaller than the corresponding BSSID among the plurality of BSSIDs included in the multiple BSSID set.

At this time, the wireless communication terminal may transmit signaling information indicating the triggering of the transmission of wireless communication terminals included in some BSSs among a plurality of BSSs corresponding to a multiple BSSID set. Specifically, by using a signaling field set to 0 when a wireless communication terminal transmits a control frame, the wireless communication terminal may transmit the signaling information. Specifically, the wireless communication terminal may transmit the signaling information by setting the Order subfield of the Frame Control field of the MAC frame format to 1. In another specific embodiment, the wireless communication terminal may transmit the signaling information by setting the Individual/Group bit of a Receiver Address or a Transmitter Address to 1. In another specific embodiment, the wireless communication terminal may set the control frame to 0 and set the To DS or From DS subfield of the Frame Control field of the MAC frame format to 1 to transmit the signaling information.

The wireless communication terminal sets the Transmitter Address of the trigger frame to one of a plurality of BSSIDs included in the multiple BSSID set and signals the offset value. Through this, the wireless communication terminal may trigger the transmission of a wireless communication terminal included in the BSS corresponding to the BSSID of an offset value from the corresponding BSSID among the plurality of BSSIDs included in the multiple BSSID set. At this time, the wireless communication terminal may signal an offset by combining several 1-bit fields used in the above-described transmission method of signaling information.

In another specific embodiment, the wireless communication terminal may signal a BSS including a wireless communication terminal triggered by a trigger frame by setting the Receiver Address of the trigger frame with a bitmap to which a plurality of BSSIDs included in the multiple BSSID set are mapped. At this time, the wireless communication terminal may set the bit corresponding to the BSS including the triggered wireless communication terminal in the bitmap to 1. The specific trigger frame format may be the same as in FIG. 18.

Figure 19:
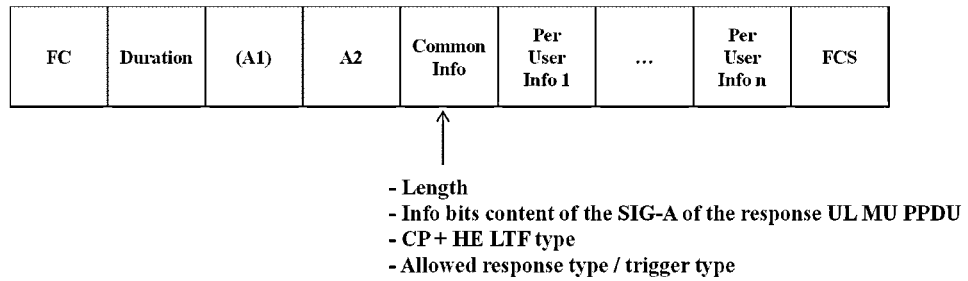
FIG. 19 shows a trigger frame format according to another embodiment of the present invention.

FIG. 19 shows a trigger frame format according to another embodiment of the present invention.

The wireless communication terminal receiving the trigger frame may transmit the trigger-based PPDU. At this time, a non-associated wireless communication terminal may receive the trigger frame and transmit the trigger-based PPDU. When the wireless communication terminal receiving the trigger frame transmits the trigger-based PPDU, the wireless communication terminal receiving the trigger frame may signal the BSS color through the signaling field of the physical layer of the PPDU. A non-associated wireless communication terminal may set the BSS color value indicated by the signaling field based on the BSS color signaled in the physical layer of the trigger frame. However, when the PPDU including the trigger frame is a legacy PPDU, the BSS color in the signaling field of the PPDU including the trigger frame may not be signaled. Therefore, the wireless communication terminal may signal the BSS color in the MAC layer of the trigger frame. Accordingly, the wireless communication terminal receiving the trigger frame may signal the BSS color value signaled in the MAC layer of the trigger frame through the signaling field of the trigger-based PPDU. Specifically, the wireless communication terminal may signal the BSS color in the Common Info field of the MAC layer of the trigger frame. At this time, the Common Info field is a field for signaling information commonly applied to a plurality of wireless communication terminals triggered by the trigger frame. In a specific embodiment, when the wireless communication terminal transmits a trigger frame allowing random access, the wireless communication terminal may signal the BSS color in the MAC layer of the trigger frame. For example, when a wireless communication terminal transmits a trigger frame allowing random access to a non-associated wireless communication terminal, the wireless communication terminal may signal the BSS color in the MAC layer of the trigger frame. In addition, when the BSS color is signaled in the MAC layer of the trigger frame, the wireless communication terminal receiving the trigger frame may determine the trigger frame as a trigger frame for random access. Specifically, when the BSS color is signaled in the MAC layer of the trigger frame, the wireless communication terminal receiving the trigger frame may determine the corresponding trigger frame as a trigger frame for random access of a non-associated wireless communication terminal.

Also, the wireless communication terminal may signal whether the BSS color is signaled in the MAC layer of the trigger frame through the physical layer of the trigger frame. Specifically, the wireless communication terminal may vary the value of the duration field of the MAC layer of the trigger frame to signal whether the BSS color is signaled in the MAC layer of the trigger frame. In a specific embodiment, when the BSS color is signaled in the MAC layer of the trigger frame, the wireless communication terminal may set the value of the Duration field of the MAC layer to be larger than the value of the Duration field of the MAC layer set when the BSS color is not signaled in the MAC layer of the trigger frame. In another specific embodiment, the wireless communication terminal may vary the indication bit of the Frame Control (FC) of the MAC layer of the trigger frame to signal whether the BSS color is signaled in the MAC layer of the trigger frame.

Figure 20:
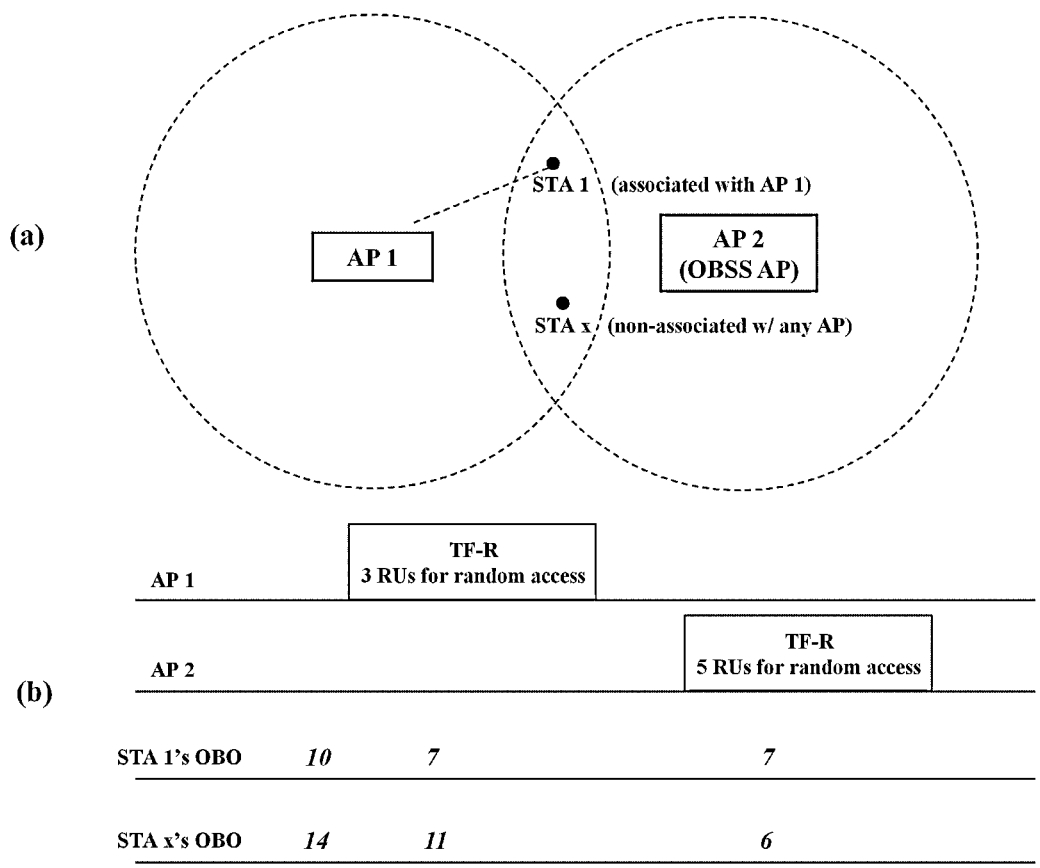
FIG. 20 shows an OFDMA backoff operation of a wireless communication terminal according to an embodiment of the present invention.

FIG. 20 shows an OFDMA backoff operation of a wireless communication terminal according to an embodiment of the present invention.

The plurality of wireless communication terminals may transmit data to any one of the wireless communication terminals using Orthogonal Frequency Division Multiplexing Access (OFDMA). At this time, the plurality of wireless communication terminals may transmit data to any one of the wireless communication terminals based on the trigger frame. In a specific embodiment, the trigger frame may signal a frequency band that a plurality of wireless communication terminals may randomly access. At this time, a plurality of wireless communication terminals may use a random value to distribute the accesses of the plurality of wireless communication terminals. Specifically, each of the plurality of wireless communication terminals may obtain a random value in an OFDMA Contention Window (OCW) and set the random value as an OFDMA backoff (OBO) counter. At this time, the OCW is a natural number. In a specific embodiment, the OCW may be adjusted according to the channel access method and traffic characteristics. The plurality of wireless communication terminal may reduce OBO counter value by the number of resource units (RUs) to which the random access is allowed signaled by the trigger frame. At this time, the RU may indicate a unit of a frequency band that the wireless communication terminal may access for data transmission. When the OBO counter value reaches 0, the wireless communication terminal may access the RU to which the random access signaled by the trigger frame is allowed. When there are a plurality of RUs to which random access is allowed, the wireless communication terminal may randomly select any one of a plurality of RUs to which random access is allowed. In addition, when the wireless communication terminal transmits the trigger frame, the wireless communication terminal may allocate a predetermined association identifier (AID) value to the RU to which random access is allowed.

The wireless communication terminal may reduce the OBO counter value based on the BSS including the wireless communication terminal and the BSS to which the trigger frame is transmitted. Specifically, when a trigger frame is transmitted from the same BSS as the BSS including the wireless communication terminal, the wireless communication terminal may reduce the OBO counter value based on the trigger frame. In another specific embodiment, when the trigger frame triggers the transmission of a plurality of wireless communication terminals included in one of the plurality of BSSs corresponding to the multiple BSSID sets or one or more BSSs, the wireless communication terminal included in the same BSS as at least one of the plurality of triggered wireless communication terminals may reduce the OBO counter value based on the trigger frame. In another specific embodiment, a non-associated wireless communication terminal may reduce the OBO counter value based on the trigger frame regardless of the BSS from which the trigger frame is transmitted. At this time, when there is a recipient that a non-associated wireless communication terminal is to transmit a frame, the non-associated wireless communication terminal may reduce the OBO counter value based only on the trigger frame transmitted from the BSS including the corresponding recipient. For example, when a non-associated wireless communication terminal is to transmit an association request frame, the non-associated wireless communication terminal may reduce the OBO counter value based on only the trigger frame transmitted from the BSS to which the recipient of the associate request frame belongs. At this point, when a non-associated wireless communication terminal is to transmit a probe request frame, the non-associated wireless communication terminal may reduce the OBO counter value based on only the trigger frame regardless of the BSS from which the trigger frame is transmitted.

FIG. 20(a) shows an associate relationship between a first access point AP 1, a second access point AP 2, a first station STA 1, and an x-th station STA x. The first access point AP 1 and the first station STA 1 are associated, and the x-th station STA x is not associated with any access point. FIG. 20(b) shows an operation in which the first station STA 1 and the x-th station STA x perform random access using OFDMA. At this time, the first station STA 1 obtains 10 as the OBO counter value. The x-th station STA x obtains 14 as the OBO counter value. The first access point AP 1 transmits a trigger frame TF-R signaling that three RUs are allowed to be randomly accessed. At this time, since the first station STA 1 is associated with the first access point AP 1, the OBO counter is reduced by 3 and the OBO counter is set to 7 based on the trigger frame TF-R. Also, since the x-th station STA x is not associated with any access point, the OBO counter is reduced by 3 and the OBO counter is set to 11. The first access point AP 2 transmits a trigger frame TF-R signaling that five RUs are allowed to be randomly accessed. At this time, since the trigger frame is transmitted in the BSS other than the BSS including the first station STA 1, the first station STA 1 does not reduce the OBO counter value. Since the x-th station STA x is not associated with any access point, the OBO counter is reduced by 5 and the OBO counter is set to 6. At this time, the station x STA x may reduce the OBO counter value according to a frame to be transmitted by the station x STA x. Specifically, when the station x STA x transmits a probe request frame, the station x STA x may reduce the OBO counter regardless of the access point that transmits the trigger frame. Also, when the station x STA x transmits an associate request frame, the station x STA x may reduce the OBO counter only when the access point that transmits the trigger frame is the access point to receive the associate request frame.

Figure 21:
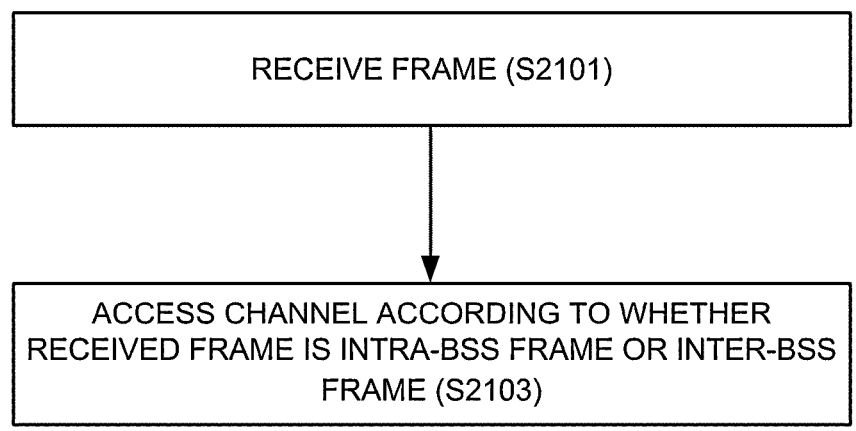
FIG. 21 shows the operation of a wireless communication terminal according to an embodiment of the present invention.

FIG. 21 shows the operation of a wireless communication terminal according to an embodiment of the present invention.

The wireless communication terminal receives the frame (S2101). Specifically, the wireless communication terminal may receive the PPDU and obtain the frame from the PPDU.

The wireless communication terminal accesses the channel according to whether the received frame is an Intra-BSS frame or an Inter-BSS frame (S2103). When a multiple BSSID set is used, the wireless communication terminal may regard a plurality of BSSs identified by each of the plurality of BSSIDs included in the same multiple BSSID set as the same BSS. When a multiple BSSID set is used, the wireless communication terminal may regard a plurality of BSSs identified by each of the plurality of BSSIDs included in the same multiple BSSID set as the same BSS. For example, the BSS of the wireless communication terminal may be a first BSS and the first BSS may correspond to a multiple BSS identifier (BSSID) set. At this time, the wireless communication terminal may regard the frame transmitted from the second BSS corresponding to the corresponding multiple BSSID as an intra-BSS frame. A multiple BSSID set is a set of BSSIDs of a plurality of BSSs classified into one group. Specifically, a plurality of BSSs corresponding to a multiple BSSID set may use the same channel In addition, a plurality of BSSs corresponding to a multiple BSSID set may be operated by one wireless communication terminal.

The wireless communication terminal may determine, based on the BSS color, whether the received frame is an Intra-BSS frame or an Inter-BSS frame. Therefore, a plurality of BSSs corresponding to the same multiple BSSID set may all have the same BSS color value. At this time, the BSS color may be information for identifying the BSS signaled through the physical layer of the frame. Specifically, the BSS color values of a plurality of BSSs corresponding to a multiple BSSID set may be set in the same manner as in the embodiment described with reference to FIG. 9 through FIG. 12. Through this, the wireless communication terminal may process a plurality of BSSs identified by the plurality of BSSIDs included in the multiple BSSIDs as the same BSS.

In another specific embodiment, each of the plurality of BSSs corresponding to the multiple BSSID set may have different BSS color values. At this time, the wireless communication terminal may obtain the BSS color values of the plurality of BSSs corresponding to the multiple BSSID sets through various signaling methods. At this time, the signaling method may be the same as that of the embodiment described with reference to FIG. 8 and FIG. 13.

The wireless communication terminal may determine, based on the MAC address signaled in the MAC layer, whether the received frame is an Intra-BSS frame or an Inter-BSS frame. At this time, the wireless communication terminal may determine, based on the address field of the received frame, whether the received frame is an Inter-BSS frame or an Intra-BSS frame. Specifically, the wireless communication terminal may determine whether the received frame is an Intra-BSS frame or an Inter-BSS frame based on the MAC address signaled in the MAC layer of the received frame and the plurality of BSSIDs included in the multiple BSSID set. In a specific embodiment, when a MAC address signaled in a MAC layer of a frame received by a wireless communication terminal matches one of a plurality of BSSIDs included in a multiple BSSID set, the wireless communication terminal may determine the received frame as an Intra-BSS frame. For example, when the Transmitter Address or Receiver Address signaled in the MAC layer of the frame received by the wireless communication terminal corresponds to another BSSID of the multiple BSSID set, the wireless communication terminal may determine the received frame as an Intra-BSS frame. At this time, the MAC address signaled in the MAC layer may be signaled with an Individual/Group bit indicating whether the MAC address is a group MAC address. In this case, the wireless communication terminal may determine whether the MAC address signaled in the MAC layer except for the Individual/Group bit matches the MAC address of the access point operating the BSS including the wireless communication terminal or the BSSID of the BSS including the wireless communication terminal. In addition, when the MAC address signaled in the MAC layer of the frame received by the wireless communication terminal is not matched with any one of the plurality of BSSIDs included in the multiple BSSID set including the BSSID of the BSS including the wireless communication terminal, the wireless communication terminal may determine the received frame as an Inter-BSS frame.

When the received frame is an Intra-BSS frame and the recipient of the received frame is not a wireless communication terminal, the wireless communication terminal may enter the power save state. At this time, when the MAC address signaled at the MAC layer of the frame received by the wireless communication terminal is matched with any one of the plurality of BSSIDs included in the multiple BSSID set and the recipient of the received frame is not a wireless communication terminal, the wireless communication terminal may enter the power save state. Specifically, when the Receiver Address or the Transmitter Address of the frame received by the wireless communication terminal is any one of a plurality of BSSIDs included in the multiple BSSID set and the Receiver Address of the received frame is not the MAC address of the wireless communication terminal, the wireless communication terminal may enter the power save state. At this time, the wireless communication terminal may maintain the power save state until the end of the duration of the PPDU including the received frame. When the wireless communication terminal determines whether or not entering the power save state, the wireless communication terminal may determine whether the Receiver Address is an address indicating a plurality of wireless communication terminals including a wireless communication terminal. The address indicating a plurality of wireless communication terminals including the wireless communication terminal may be at least one of the broadcast address, the multicast address, and the group address described above. Specifically, the wireless communication terminal may operate in the same manner as the embodiments described with reference to FIG. 10 and FIGS. 14 and 15.

Also, the wireless communication terminal may apply a different CCA threshold value according to whether the received frame is an Inter-BSS frame or an Intra-BSS frame. For convenience of explanation, a BSS corresponding to the multiple BSSID set that the first BSS corresponds is referred to as a second BSS, and a BSS not corresponding to the multiple BSSID set that the first BSS corresponds is referred to as a third BSS. When the frame received by the wireless communication terminal is transmitted from the second BSS, the wireless communication terminal may apply the general CCA level not the OBSS CCA level as the CCA threshold value. When the frame received by the wireless communication terminal is transmitted from the third BSS, the wireless communication terminal may apply the OBSS CCA level as the CCA threshold value. In another specific embodiment, when the frame received by the wireless communication terminal is transmitted from the second BSS, the wireless communication terminal may not access the corresponding channel regardless of the received signal strength. Specifically, the wireless communication terminal may operate as in the embodiment described with reference to FIGS. 8, 11, and 12.

In addition, the wireless communication terminal may change the NAV setting depending on whether the received frame is an Intra-BSS frame or an Inter-BSS frame. Specifically, the wireless communication terminal may separately set the NAV for the intra-BSS frame and the NAV for the inter-BSS frame. At this time, when the wireless communication terminal receives the Intra-BSS frame, the wireless communication terminal may set or update the NAV for the intra-BSS frame based on the received Intra-BSS frame. In addition, when the wireless communication terminal receives the Inter-BSS frame, the wireless communication terminal may set or update the NAV for the inter-BSS frame based on the received Inter-BSS frame. For convenience of explanation, a BSS corresponding to the multiple BSSID set that the first BSS corresponds is referred to as a second BSS, and a BSS not corresponding to the multiple BSSID set that the first BSS corresponds is referred to as a third BSS. When the wireless communication terminal receives the frame transmitted from the second BSS, the wireless communication terminal may set or update the NAV for the Intra-BSS frame based on the frame transmitted from the second BSS. When the wireless communication terminal receives the frame transmitted from the second BSS, the wireless communication terminal may set or update the NAV for the Intra-BSS frame based on the frame transmitted from the second BSS. In a specific embodiment, when the wireless communication terminal receives the CF-END frame from the OBSS, the wireless communication terminal may not reset the NAV for the Intra-BSS frame. Accordingly, when the wireless communication terminal receives the CF-END frame transmitted from the second BSS identified by the second BSSID, the wireless communication terminal may reset the NAV for the Intra-BSS frame and maintain the NAV for the inter-BSS frame as before. When the wireless communication terminal receives the CF-END frame transmitted from the third BSS, the wireless communication terminal may reset the NAV for the inter-BSS frame and maintain the NAV for the intra-BSS frame as before.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal that communicates wirelessly, the wireless communication terminal comprising:
    a transceiver; and
    a processor,
    wherein a basic service set (BSS) of the wireless communication terminal corresponds to a multiple BSS identifier (BSSID) set,
    wherein the multiple BSSID set is a set of a BSSID of each of a plurality of BSSs classified into one group,
    wherein the processor is configured to:
    receive a first frame through the transceiver,
    determine the first frame as an Intra-BSS frame when a medium access control (MAC) address signaled in a MAC header of the first frame matches any one of a plurality of BSSIDs included in the multiple BSSID set,
    sense a signal strength while receiving the first frame,
    determine, according to comparing the signal strength with a threshold, whether to transmit a second frame while the first frame is being transmitted, wherein a value of the threshold is determined based on the determining the first frame as the Intra-BSS frame, and
    transmit the second frame based on the determining whether to transmit the second frame,
    wherein values of BSS colors corresponding to the plurality of BSSs are the same as each other.

2. The wireless communication terminal of claim 1, wherein the processor is configured to apply a first threshold to the determining whether to transmit the second frame when the first frame is the Intra-BSS frame, and apply a second threshold to the determining whether to transmit the second frame when the first frame is an Inter-BSS frame,
wherein the second threshold is determined in an Overlapped BSS (OBSS) level range,
wherein the OBSS level range includes values equal to or greater than the first threshold.

3. The wireless communication terminal of claim 1, wherein the processor is configured to separately set a Network Allocation Vector (NAV) for an Intra-BSS frame and a NAV for an Inter-BSS frame and access a channel based on the NAV for the Intra-BSS frame and the NAV for the Inter-BSS frame.

4. The wireless communication terminal of claim 3, wherein when a transmitter address (TA) or a receiver address (RA) in the MAC header of the first frame matches any one of the plurality of BSSIDs included in the multiple BSSID set, the processor is configured to set the NAV for the Intra-BSS frame based on the first frame.

5. A method of operating a wireless communication terminal that communicates wirelessly, the method comprising:
receiving a first frame;
determining the first frame as an Intra-BSS frame when a medium access control (MAC) address signaled in a MAC header of the first frame matches any one of a plurality of BSSIDs included in a multiple basic service set identifier (BSSID) set to which a BSS of the wireless communication terminal corresponds, wherein the multiple BSSID set is a set of a BSSID of each of a plurality of BSSs classified into one group;
sensing a signal strength while receiving the first frame;
determining, according to comparing the signal strength with a threshold, whether to transmit a second frame while the first frame is being transmitted, wherein a value of the threshold is determined based on determining the first frame as the Intra-BSS frame; and
performing a transmission based on the determining whether to transmit the second frame,
wherein values of BSS colors corresponding to the plurality of BSSs are the same as each other.

6. The method of claim 5, the method further comprises applying a first threshold to the determining whether to transmit the second frame when the first frame is the Intra-BSS frame, and
applying a second threshold to the determining whether to transmit the second frame when the first frame is an Inter-BSS frame,
wherein the second threshold is determined within a OBSS level range,
wherein the OBSS level range includes values equal to or greater than the first threshold.

7. The method of claim 5, the method further comprises separately setting a Network Allocation Vector (NAV) for an Intra-BSS frame and a NAV for an Inter-BSS frame and access a channel based on the NAV for the Intra-BSS frame and the NAV for the Inter-BSS frame.

8. The method of claim 7, wherein the separately setting the NAV comprises setting the NAV for the Intra-BSS frame based on the first frame when a transmitter address (TA) or a receiver address (RA) signaled in the MAC header of the first frame matches any one of the plurality of BSSIDs included in the multiple BSSID set.

* * * * *